United States Patent
Lee

(10) Patent No.: US 10,073,669 B2
(45) Date of Patent: Sep. 11, 2018

(54) IMAGE DISPLAY DEVICE AND METHOD OF CONTROLLING THE SAME

(71) Applicant: SAMSUNG ELECTRONICS CO., LTD., Suwon-si (KR)

(72) Inventor: Yui Yoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 14/790,466

(22) Filed: Jul. 2, 2015

(65) Prior Publication Data

US 2016/0026426 A1    Jan. 28, 2016

(30) Foreign Application Priority Data

Jul. 25, 2014   (KR) .................. 10-2014-0094498

(51) Int. Cl.
```
G09G 5/00      (2006.01)
G06F 3/14      (2006.01)
G06F 3/147     (2006.01)
G06T 11/60     (2006.01)
```
(52) U.S. Cl.
CPC ............ *G06F 3/1454* (2013.01); *G06F 3/147* (2013.01); *G06T 11/60* (2013.01)

(58) Field of Classification Search
CPC ....... G09G 5/377; G06F 3/1454; G06F 3/147; G06T 11/60
USPC ......................................................... 345/629
See application file for complete search history.

(56) References Cited

U.S. PATENT DOCUMENTS

| | | | | |
|---|---|---|---|---|
| 2008/0214233 A1* | 9/2008 | Wilson | ................ | H04M 1/7253 455/556.1 |
| 2013/0182005 A1* | 7/2013 | Fretwell | ................ | G06F 3/0488 345/629 |
| 2013/0229482 A1* | 9/2013 | Vilcovsky | .............. | H04N 7/144 348/14.07 |
| 2014/0226007 A1* | 8/2014 | Hsu | .......................... | H04N 7/18 348/143 |
| 2014/0362429 A1* | 12/2014 | Yokozeki | ............ | H01L 27/3232 359/267 |

FOREIGN PATENT DOCUMENTS

| | | |
|---|---|---|
| JP | 2005-136538 A | 5/2005 |
| KR | 10-2008-0087956 A | 10/2008 |
| KR | 10-2010-0050411 A | 5/2010 |
| KR | 10-2013-0032776 A | 4/2013 |

* cited by examiner

*Primary Examiner* — Jonathan Boyd
(74) *Attorney, Agent, or Firm* — Sughrue Mion, PLLC

(57) ABSTRACT

Disclosed herein are an image display device and a method of controlling the image display device. The image display device includes an image acquirer configured to acquire a user image, an image outputter configured to display the user image, a communicator configured to perform communication with a mobile terminal, a controller configured to perform a real time image display operation. The real time image display operation includes displaying the user image in real time and transmitting image data processed from the user image to the mobile terminal when a real time image display command is input.

12 Claims, 32 Drawing Sheets

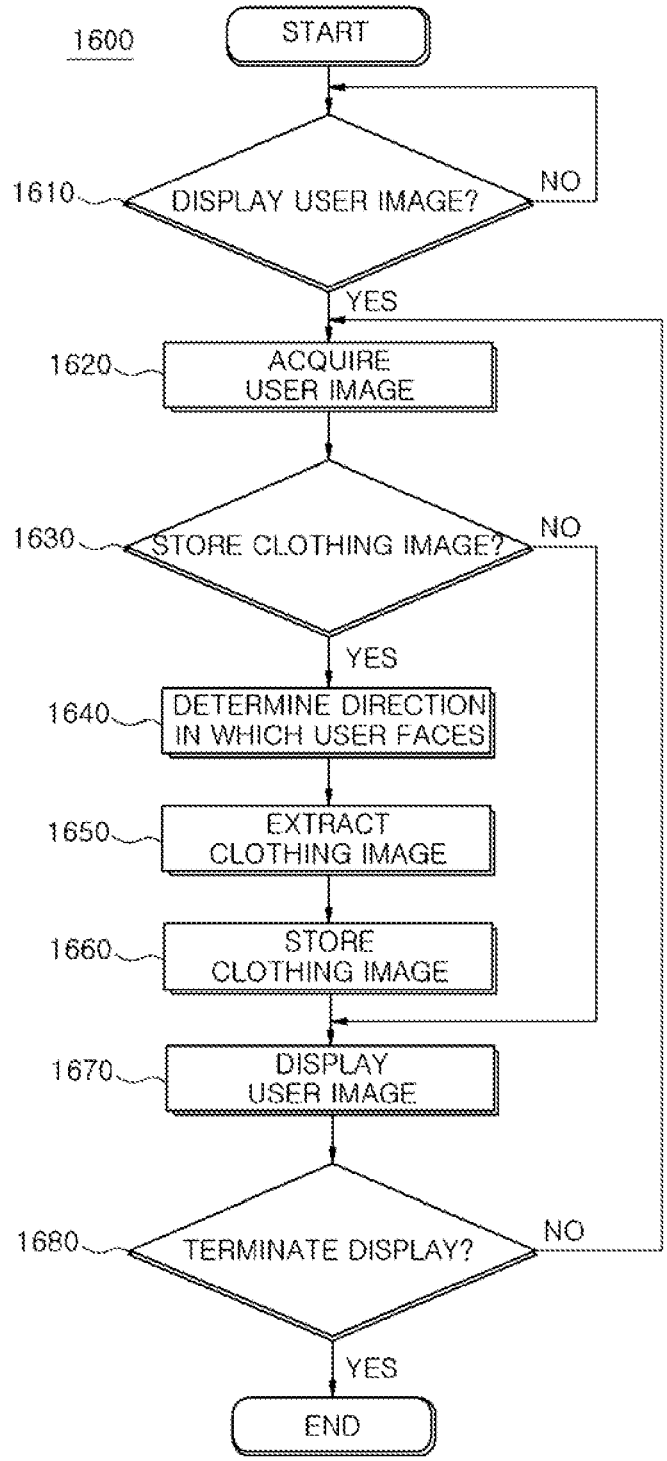

IMAGE DISPLAY DEVICE AND METHOD OF CONTROLLING THE SAME

CROSS-REFERENCE TO RELATED APPLICATION

This application claims priority from Korean Patent Application No. 10-2014-0094498, filed on Jul. 25, 2014 in the Korean Intellectual Property Office, the disclosure of which is incorporated herein by reference.

BACKGROUND

1. Field

Exemplary embodiments of the disclosure relate to an image display device and a method of controlling the same. More specifically, exemplary embodiments of the disclosure relate to an image display device capable of acquiring an image of a user and displaying the acquired image in real time, and a method of controlling the same.

2. Description of the Related Art

Generally, image display devices are devices configured to display visual image information.

Recently, due to advancing electronic technology, flat display devices have been developed which can provide decreased weight and volume, which are the disadvantages of cathode ray tube display devices. These flat display devices can impose fewer limitations on installation spaces, easily realize an image of a large screen and flattening, and have various desirable capabilities such as a high image quality, and/or the like, are being developed.

Some representative examples of these image display devices are liquid crystal display (LCD) devices, electroluminescence display (ELD) devices, organic light emitting diode (OLED) displays, field emission display (FED) devices, plasma display panels, (hereinafter referred to as "PDP"), thin film transistor-liquid crystal display (TFT-LCD) devices, flexible display devices, and/or the like.

Also, recently, image display devices have been developed which include cameras to acquire an image of a user who is watching the image display device.

However, generally in these image display devices, the camera only maintains a level of simply acquiring and storing the image of the user, and is not used for any other purpose.

SUMMARY

Therefore, it is an aspect of the disclosure to provide an image display device capable of displaying a mirror effect using a camera and a display which are included in the image display device, and a method of controlling the same.

Additional exemplary embodiments will be set forth in part in the description which follows According to one aspect of an exemplary embodiment, an image display device includes an image acquirer configured to acquire a user image, an image outputter configured to display the user image, a communicator configured to perform communication with a mobile terminal; and, a controller configured to perform a real time image display operation, the real time image display operation including displaying the user image in real time and transmitting image data processed from the user image to the mobile terminal when a real time image display command is input.

The image display device can be further configured to perform the real time image display operation when the image acquirer acquires an image of the mobile terminal.

The image display device can be further configured such that when the image acquirer acquires the image of the mobile terminal, the controller transmits a message inquiring whether to display the user image in real time to the mobile terminal, when the real time image display command is received from the mobile terminal, the controller performs the real time image display operation.

The image display device can be further configured to include a sound receiver configured to receive a voice command. When the voice command corresponds to the real time image display command, the controller can perform the real time image display operation.

The image display device can be further configured to include storage configured to store image data corresponding to the user image. When an image storage command is received, the controller can process the user image to generate the image data and then store the image data.

The image display device can be further configured such that when an image replay command is received, the controller restores a restored image from the stored image data, and controls the image outputter to display the restored image.

The image display device can be further configured such that when a clothing image storage command is received, the controller extracts a clothing image from the user image and stores the extracted clothing image.

The image display device can be further configured such that when the clothing image storage command is received, the controller determines a direction in which a user faces based on the image, extracts the clothing image from the user image, determines a correspondence between the extracted clothing image and the direction of the user, and stores the direction of the user and the extracted clothing image in the storage.

The image display device can be further configured such that when a clothing image display command is input, the controller synthesizes the stored clothing image with the user image and displays the synthesized user image.

The image display device can be further configured such that when the clothing image display command is input, the controller determines a direction in which a user faces based on the user image acquired by the image acquirer, and overlaps the clothing image corresponding to the direction of the user with the user image.

According to one aspect of an exemplary embodiment, a method of controlling an image display device includes acquiring a user image, displaying the user image, converting the user image into user image data, and transmitting the user image data to a mobile terminal.

The method can also include transmitting the user image to the mobile terminal when an image of the mobile terminal is detected.

The method can also include transmitting the user image to the mobile terminal when a user image display command is received from a voice.

The method can also include storing the image data when an image storage command is received.

The method can also include displaying a restored image corresponding to the stored image data when an image replay command is received.

The method can also include when a clothing image storage command is received, extracting a clothing image from the user image, and storing the clothing image.

The method can also include determining a correspondence between the extracted clothing image and a direction of a user based on the user image, and storing the direction of the user and the clothing image.

The method can also include displaying the stored clothing image on the user image when a clothing image display command is input.

The method can also include overlapping the clothing image with the user image.

According to one aspect of an exemplary embodiment, a mobile terminal can include a terminal communicator configured to communicate with an image display device, and a terminal controller configured to receive a signal of an input of a user and to control the terminal communicator to transmit an image display command to the image display device, the image display command being based on the signal, wherein the image display device acquires a user image of a user and outputs the acquired user image when receiving the image display command.

The mobile terminal can be configured so that the terminal controller determines a distance between the mobile terminal and the image display device, and controls the terminal communicator to transmit the image display command to the image display device when the determined distance is within a predetermined range.

The mobile terminal can also include a terminal image acquirer, and the terminal controller can be configured to control the terminal image acquirer to acquire an image, determine whether the image display device is present in the image, and control the terminal communicator to transmit the image display command to the image display device when the image display device is present in the image.

The mobile terminal can also include a terminal sound receiver, wherein the terminal controller controls the terminal sound receiver to receive a voice command, and controls the terminal communicator to transmit the image display command to the image display device when the voice command corresponds to the image display command.

The mobile terminal can also include a terminal image outputter, wherein the terminal controller is configured to control the terminal communicator to receive the user image from the image display apparatus and to control the terminal image outputter to display the received user image.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 21, 22A-22B, and 23A-23B illustrate one example of a clothing image storage operation configured to extract and store a clothing image from a user image by an image system according to an exemplary embodiment of the disclosure.

DETAILED DESCRIPTION

Figure 1:
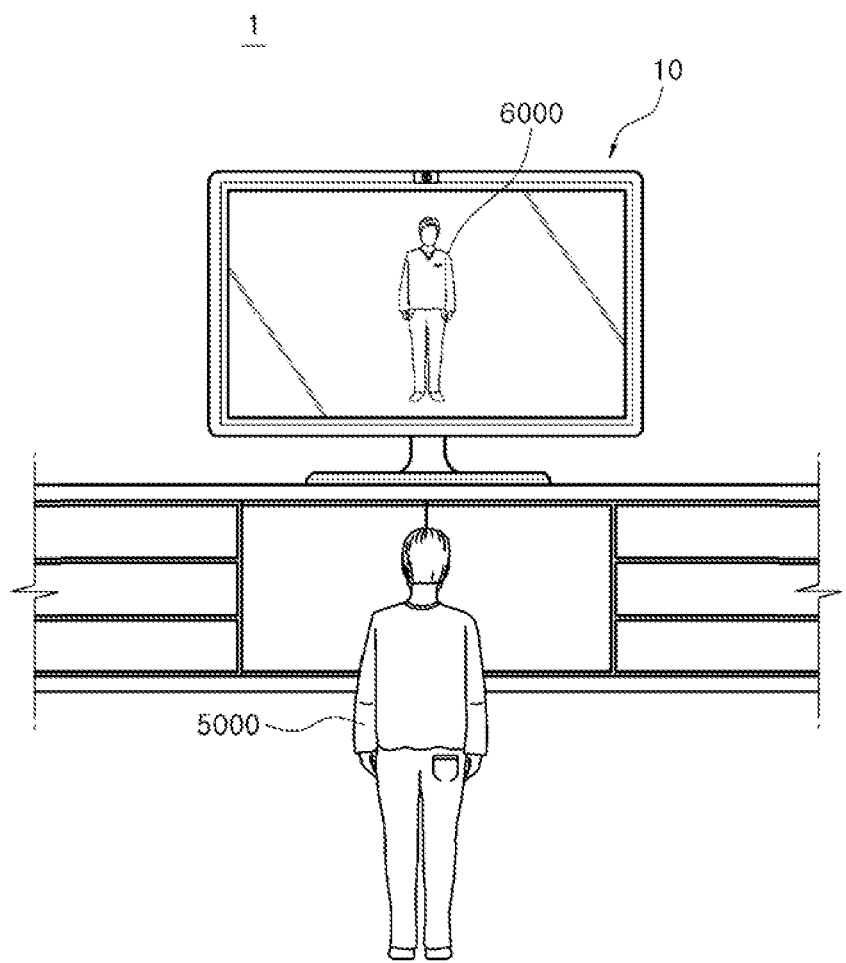
FIG. 1 illustrates one example of the operation of an image system according to one exemplary embodiment of the disclosure.

Reference will now be made in detail to the exemplary embodiments of the disclosure, examples of which are illustrated in the accompanying drawings, wherein like reference numerals refer to like elements throughout. Expressions such as "at least one of," when preceding a list of elements, modify the entire list of elements and do not modify the individual elements of the list.

The exemplary embodiments described in the present specification and structures described in drawings are only examples, and at the time of the application, the disclosure is susceptible to various modifications and alternative forms which can substituted for the exemplary embodiments of the present specification.

Hereinafter, exemplary exemplary embodiments will be described in detail with reference to the accompanying drawings.

Figure 2:
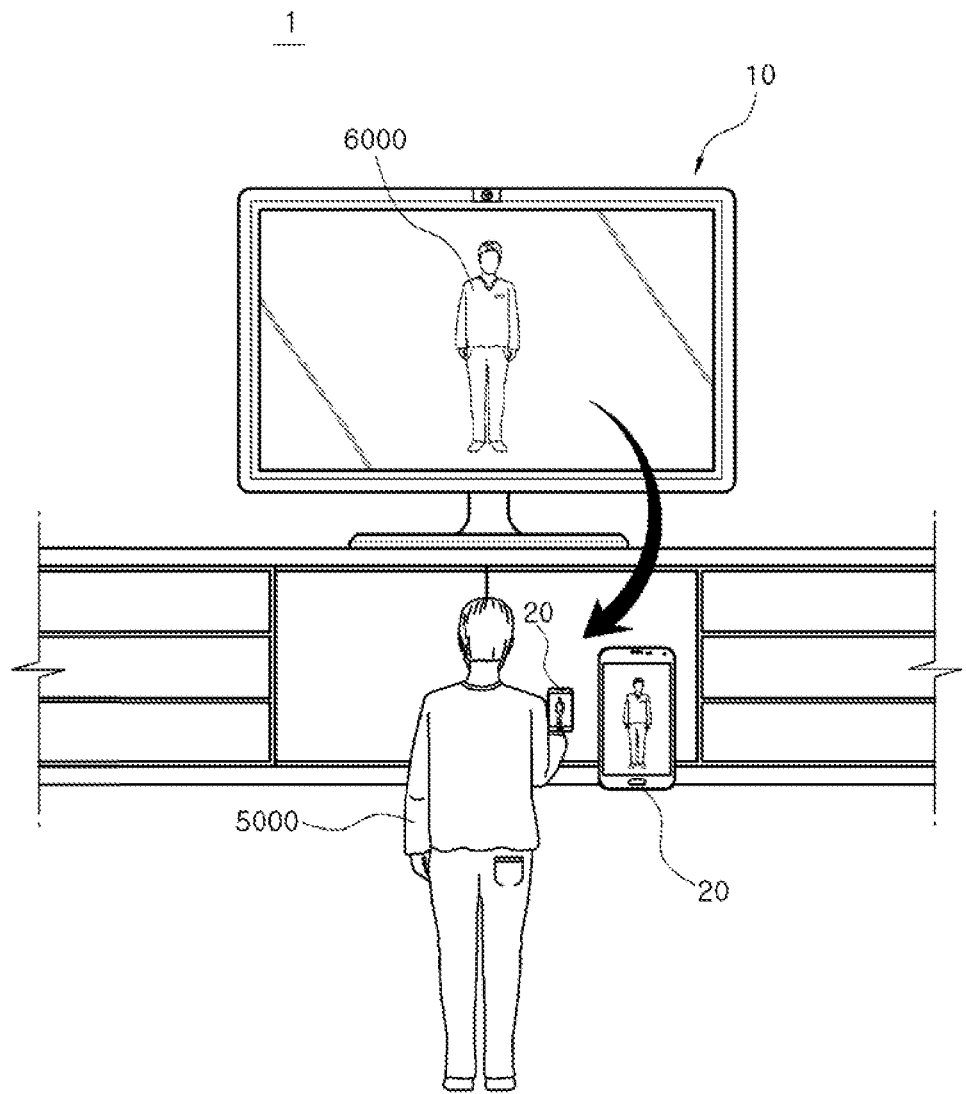
FIG. 2 illustrates another example of the operation of the image system according to the exemplary embodiment of the disclosure.
Figure 3:
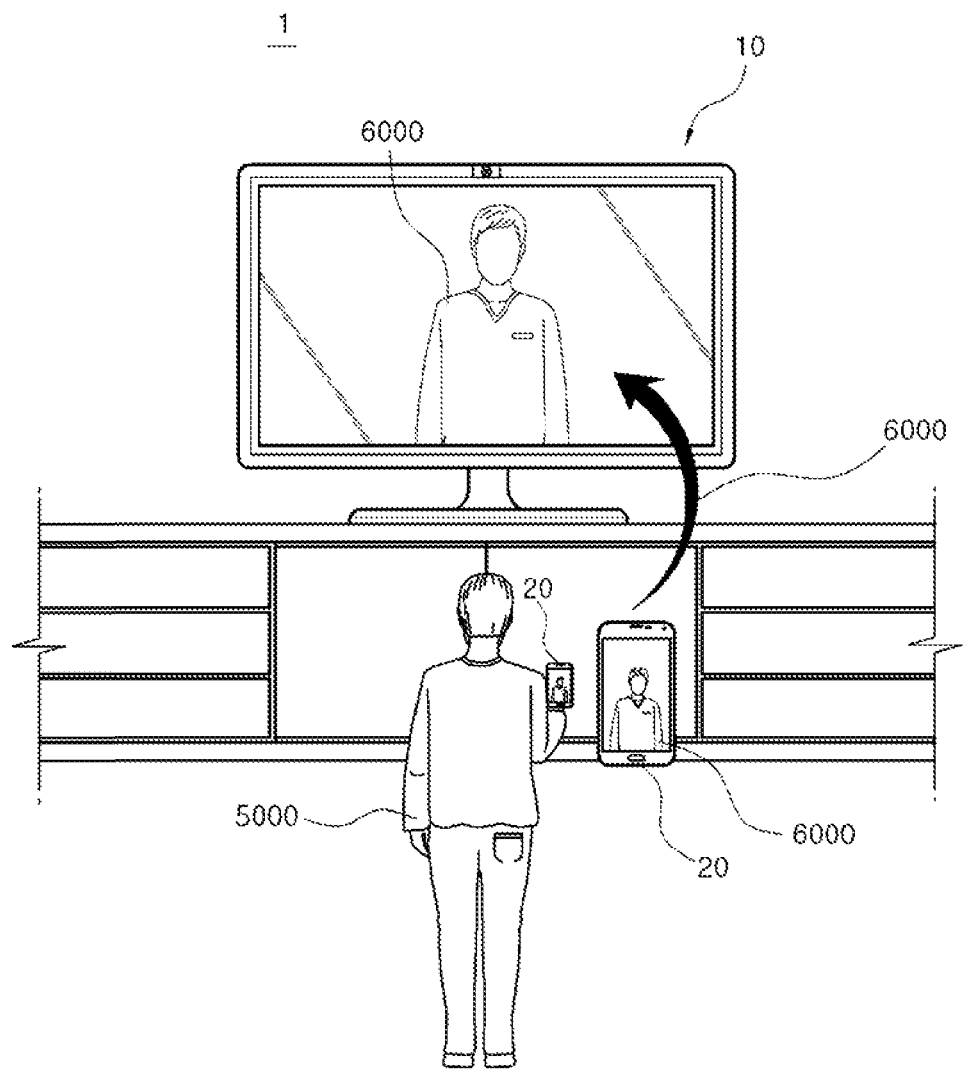
FIG. 3 illustrates still another example of the operation of the image system according to the exemplary embodiment of the disclosure.

FIG. 1 illustrates one example of an operation of an image system according to one exemplary embodiment, FIG. 2 illustrates another example of an operation of the image system according to the embodiment, and FIG. 3 illustrates still another example of an operation of the image system according to the exemplary embodiment.

As shown in FIGS. 1, 2, and 3, an image system 1 includes an image display device 10 configured to acquire and display an image, and a mobile terminal 20.

The image display device 10 may display an image received by wired or wireless communication, or an image stored in the image display device 10 or an external storage medium.

Also, the image display device 10 may acquire a user image 6000 using a camera, and/or the like as illustrated in FIG. 1, and display the acquired user image 6000 in real time. In an exemplary embodiment, real time may mean that the acquired user image 6000 is displayed at substantially the same time the user image 6000 is acquired.

The user 5000 may verify his or her own image from various angles using the user image 6000 displayed on the image display device 10 in real time. For example, the user U may verify his or her own attire using the user image 6000 displayed on the image display device 10, or verify his or her own hairstyle.

Also, the image display device 10 may perform wired or wireless data communication with an external device such as the mobile terminal 20, and/or the like.

In particular, the image display device 10 may transmit image data corresponding to the user image 6000 to the mobile terminal 20, and thus, the user 5000 may view his or her own image even from various angles.

The above image display device 10 may include display devices of various types such as a television, a monitor, a beam projector, or the like.

The mobile terminal 20 may perform voice communication with the external device or data communication with the external device.

In particular, the mobile terminal 20 may acquire an image and display the acquired image, or receive the image data from the external device and display an image corresponding to the received image data.

For example, as shown in FIG. 2, when the image display device 10 transmits image data corresponding to the user image 6000, the mobile terminal 20 may display a user image 6000 corresponding to the image data.

Since the image display device 10 configured to acquire an image is physically separated from the mobile terminal 20 configured to display the image, the user 5000 may view the user image 6000 acquired from various angles by the image display device 10 through the mobile terminal 20.

Since the user 5000 holds and rotates the mobile terminal 20, the image display device 10 may photograph the user 5000 from various angles, and the user 5000 may view the user image 6000 acquired from various angles by the image display device 10 through the mobile terminal 20.

In yet another exemplary embodiment of the disclosure, as shown in FIG. 3, the mobile terminal 20 may acquire the user image 6000, and transmit image data corresponding to the acquired user image 6000 to the image display device 10. The image display device 10 receiving the image data from the mobile terminal 20 may display the user image 6000 corresponding to the received image data.

The user 5000 may view an image acquired by the mobile terminal 20 from various angles through the image display device 10.

The user 5000 moves a position of the mobile terminal 20, and thus, the mobile terminal 20 may photograph the user 5000 from various angles, and the user 5000 may view the user image 6000 acquired from the various angles by the mobile terminal 20 through the image display device 10.

An exemplary embodiment of operation of the image system 1 including the image display device 10 and the mobile terminal 20 is described above.

An example of a configuration and an operation of the image display device 10 and the mobile terminal 20 is described below with reference to the accompanying drawings.

Figure 4:
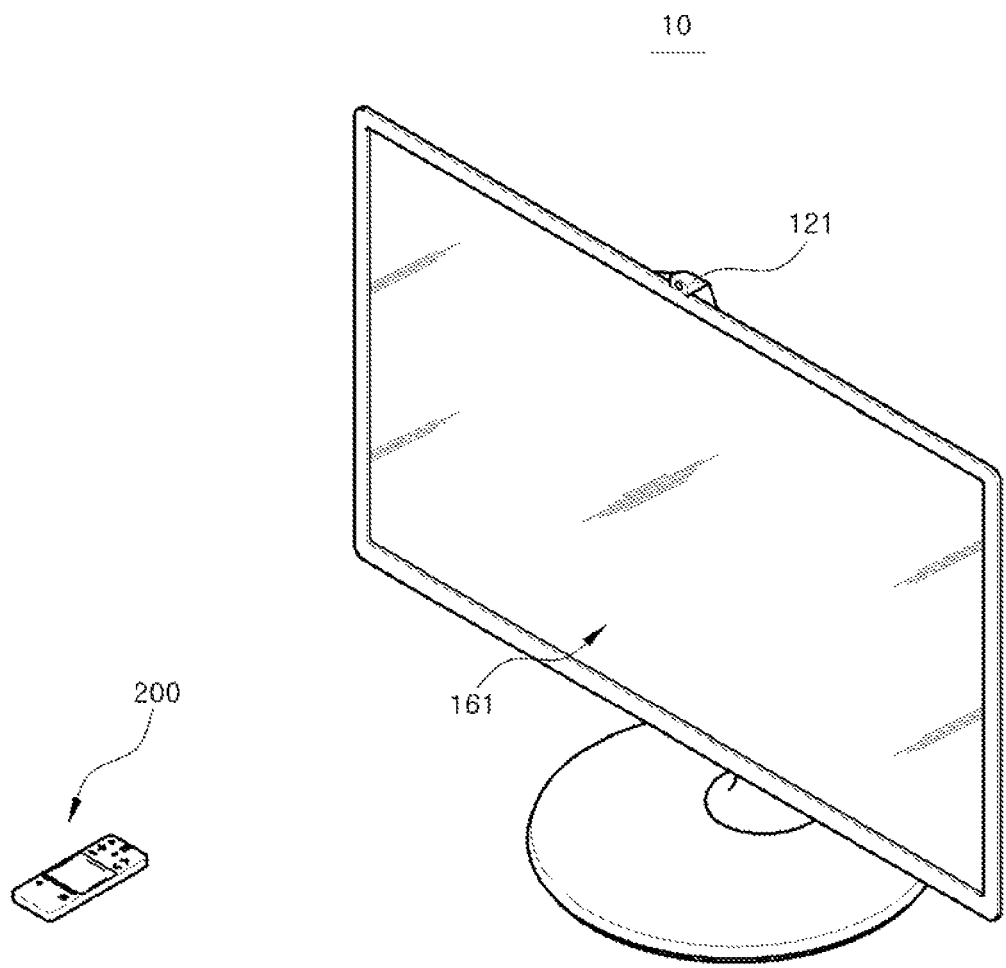
FIG. 4 illustrates an exterior of an image display device according to an exemplary embodiment of the disclosure.
Figure 5:
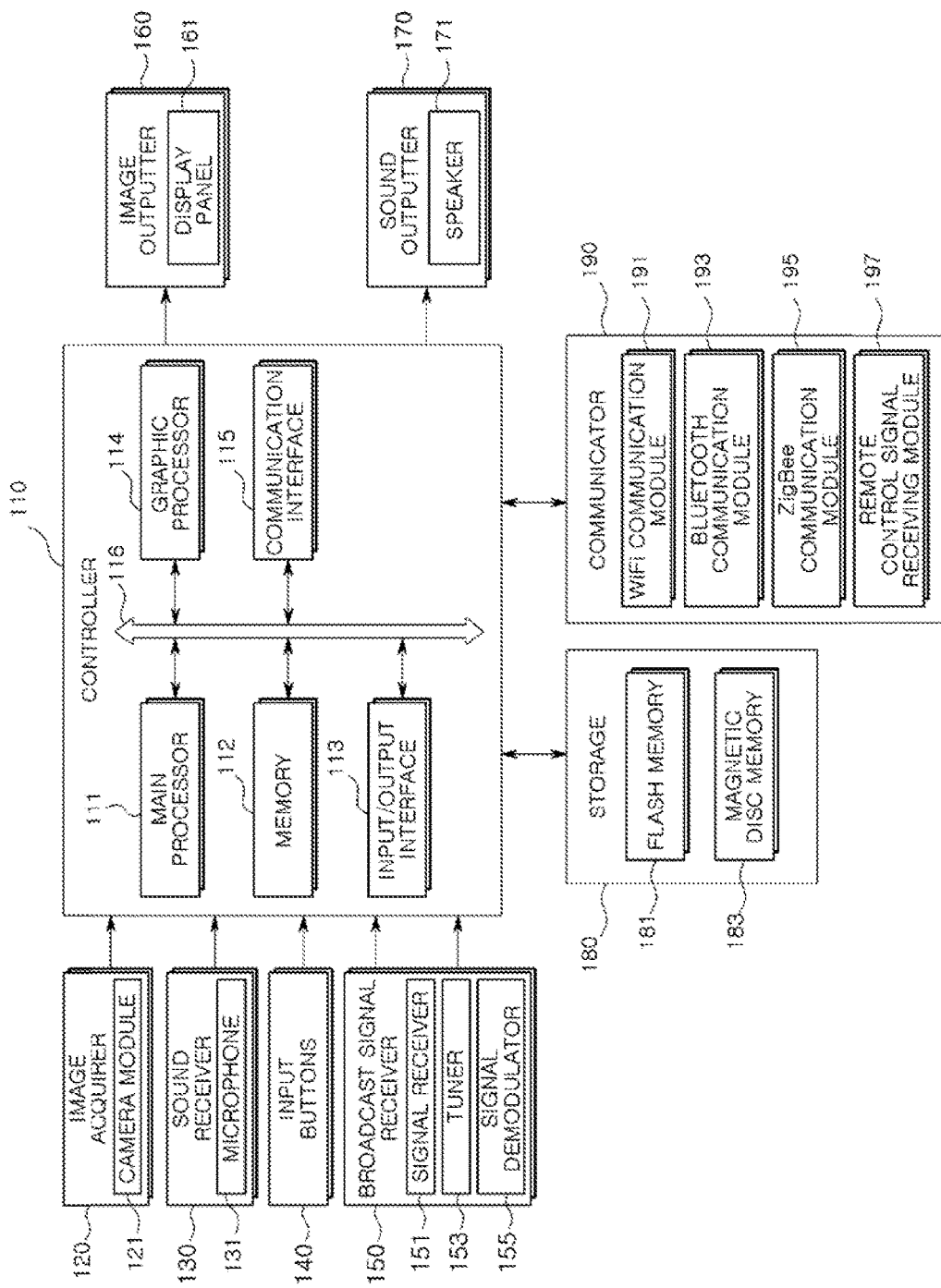
FIG. 5 illustrates a configuration of an image display device main body of an image display device according to an exemplary embodiment of the disclosure.

FIG. 4 illustrates an exterior of an image display device according to one exemplary embodiment of the disclosure, and FIG. 5 illustrates a configuration of an image display device main body of an image display device according to an exemplary embodiment of the disclosure.

Referring to FIGS. 4 and 5, an image display device 10 includes an image display device main body 100 configured to display an image and a remote device 200 configured to transmit a control command of a user to the image display device main body 100.

The image display device main body 100 may include an image acquirer 120, a sound receiver 130, one or more input buttons 140, a broadcast signal receiver 150, an image outputter 160, a sound outputter 170, a storage 180, a communicator 190, and a controller 110.

The image acquirer 120 includes a camera module 121 configured to acquire an image in front of the image display device main body 100.

The camera module 121 acquires light in front of the image display device main body 100, the acquired light is converted into image data, and the converted image data is transmitted to the controller 110. Also, the camera module 121 may be provided on an upper side of the image display device main body 100 as shown in FIG. 4.

The camera module 121 includes an image sensor (not shown) configured to convert light into an electrical signal, and the image sensor may include a charge coupled device (CCD) image sensor or a complementary metal oxide semiconductor (CMOS) image sensor.

The sound receiver 130 includes a microphone 131 configured to acquire an ambient sound of the image display device main body 100.

The microphone 131 acquires the ambient sound of the image display device main body 100, converts the acquired ambient sound into electrical sound data, and transmits the converted sound data to the controller 110.

In particular, the microphone 131 may receive a control command through a voice of a user. That is, the microphone 131 may receive the voice control command of the user, and transmit the received voice control command to the controller 110.

The input buttons 140 may include a plurality of input buttons (not shown) configured to receive a control command from the user. For example, the input buttons 140 may include a power button configured to turn the power of the image display device 10 on or off, a channel button configured to change a channel of a broadcast displayed by the image display device 10, a volume button configured to change a volume of a sound output from the image display device 10, or the like.

Also, each of the input buttons may include a push switch, a membrane switch, a touch switch, or the like.

The broadcast signal receiver 150 receives a broadcast signal including image data and sound data, and restores the image data and the sound data from the broadcast signal.

In particular, the broadcast signal receiver 150 may include a signal receiver 151 configured to receive the broadcast signals transmitted over wires or wirelessly, a tuner 153 configured to select the broadcast signal of a specific channel from among the received broadcast signals, and a signal demodulator 155 configured to reconstruct image data and sound data from the selected broadcast signal.

The image outputter 160 includes a display panel 161 configured to output a visible light image.

The display panel 161 may be provided in a front face of the image display device main body 100, and convert an electrical signal transmitted from the controller 110 into the visible light image, and output the converted visible light image.

The above display panel 161 may include an OLED panel, an LCD panel, a PDP, or the like.

The sound outputter 170 includes a speaker 171 configured to output a sound.

The speaker 171 may be provided on a side of the image display device main body 100, and convert an electrical signal transmitted from the controller 110 into a sound, and output the converted sound.

The storage 180 stores a control program and control data configured to control the image display device 10, image data and sound data stored by the user 5000, or the like.

The storage 180 may operate as an auxiliary storage device configured to supplement a memory 112 included in the controller 110 which will be described below, and include a nonvolatile storage medium in which stored data is not erased although electrical power of the image display device 10 may turn off.

As described above, the storage 180 may include a flash memory 181 configured to store data in a semiconductor device, a magnetic disk memory 183 configured to store data in a magnetic disk, or the like.

The communicator 190 transmits data to an external device such as the mobile terminal 20, or the like, and receives data from an external device. In particular, the communicator 190 modulates a signal to be transmitted according to a communication protocol, and wirelessly or over wires transmits the modulated signal, and wirelessly or over wires receives a signal, and demodulates the received signal.

The communicator 190 may include a WIFI communication module 191 in communication with a local area network (LAN) through an access point, a BLUETOOTH communication module 193 configured to communicate one-to-one with the external device or communicate one-to-many with a plurality of external devices, a ZIGBEE communication module 195 configured to form a communication network with a plurality of the external devices, or the like.

For example, the image display device main body 100 may transmit/receive data to/from the mobile terminal 20 through the WIFI communication module 191, the BLUETOOTH communication module 193, the ZIGBEE communication module 195, and/or the like.

Also, the communicator 190 may further include a remote control signal receiving module 197 configured to receive a remote control signal from the remote device 200.

For example, the remote control signal receiving module 197 may receive a remote control signal from the remote device 200 through infrared light, and demodulate the received remote control signal, and thus, transmit the demodulated remote control signal to the controller 110.

The controller 110 generally controls operation of the image display device main body 100.

In particular, the controller 110 may include an input/output interface 113 configured to mediate data input/output between an input/output device and the controller 110 included in the image display device main body 100, a communication interface 115 configured to mediate data input/output between a communication device and the controller 110 included in the image display device main body 100, a graphic processor 114 configured to perform image processing, the memory 112 configured to store a program and data, and a main processor 111 configured to perform calculation based on the program and the data stored in the memory 112.

Also, the input/output interface 113, the graphic processor 114, the communication interface 115, the memory 112, and the main processor 111 may exchange data with each other through a system bus 116.

The input/output interface 113 may receive the image data from the image acquirer 120, receive the sound data from the sound receiver 130, and receive the control command data from the input buttons 140. Also, the input/output interface 113 may transmit the image data to the image outputter 160, and transmit the sound data to the sound outputter 170.

In particular, the input/output interface 113 may transmit the image data of the image acquirer 120, the sound data of the sound receiver 130, the control signal data of the input buttons 140 to the main processor 111, the memory 112, the graphic processor 114, or the like through the system bus 116. Also, the input/output interface 113 may transmit the image data received from the main processor 111, the memory 112, or the graphic processor 114 to the image outputter 160 through the system bus 116, and transmit the sound data to the sound outputter 170.

The communication interface 115 may receive the broadcast signal from the broadcast signal receiver 150, and receive the communication data from the communicator 190, and transmit the communication data to the communicator 190.

In particular, the communication interface 115 may transmit the communication data transmitted from the WIFI communication module 191, the BLUETOOTH communication module 193, or the ZIGBEE communication module 195 to the main processor 111, the memory 112, the graphic processor 114, or the like through the system bus 116, and transmit the remote control data transmitted from the remote control signal receiving module 197 to the main processor 111, the memory 112, the graphic processor 114, or the like through the system bus 116.

Also, the communication interface 115 may transmit the communication data received from the main processor 111, the memory 112, or the graphic processor 114 to the WIFI communication module 191, the BLUETOOTH communication module 193, or the ZIGBEE communication module 195.

The graphic processor 114 may convert the image acquired by the image acquirer 120 to the image data to be stored in the memory 112 or the storage 180, and convert the image received by the image acquirer 120 to the image data to be transmitted through the communicator 190.

Also, the graphic processor 114 may change a resolution or a size of an image, or change brightness, chroma, a color, or the like.

The memory 112 may store a program or data configured to control an operation of the image display device main body 100, or store image data acquired by the image acquirer 120 or received through the communicator 190.

The memory 112 may include a volatile memory such as an SRAM, a DRAM, or the like. However, the memory 112 is not limited to the above, and in some cases, the memory 112 may further include a nonvolatile memory such as a flash memory, an erasable programmable read only memory (EPROM), or the like which is separated from the storage 180. In addition, the memory 112 and the storage 180 may be integrally provided.

The main processor 111 may generally control the operation of the image display device main body 100 based on a program and data stored in the memory 112.

For example, the main processor 111 may control the image outputter 160 and the sound outputter 170, and thus, the broadcast image and the broadcast sound received through the broadcast signal receiver 150 are output through the image outputter 160 and the sound outputter 170.

Also, the main processor 111 may store image data received through the communicator 190 in the memory 112, or display an image corresponding to the received image data on the image outputter 160. In addition, the main processor 111 may store the image data corresponding to the image acquired through the image acquirer 120 in the memory 112.

Also, the main processor 111 may recognize a voice control command based on sound data received from the sound receiver 130. In particular, when the user 5000 inputs a control command through a voice, the main processor 111 compares the sound data received through the sound receiver 130 with a previously stored voice control command, and thus, recognizes the voice control command of the user 5000.

The main processor 111 is separated from the graphic processor 114 in the above description, but is not limited to the above and the main processor 111 may be integrally provided with the graphic processor 114.

As described above, the controller 110 may generally control the operation of the image display device main body 100, and the operation of the image display device 10, described below, may be controlled by controller 110.

Figure 6:
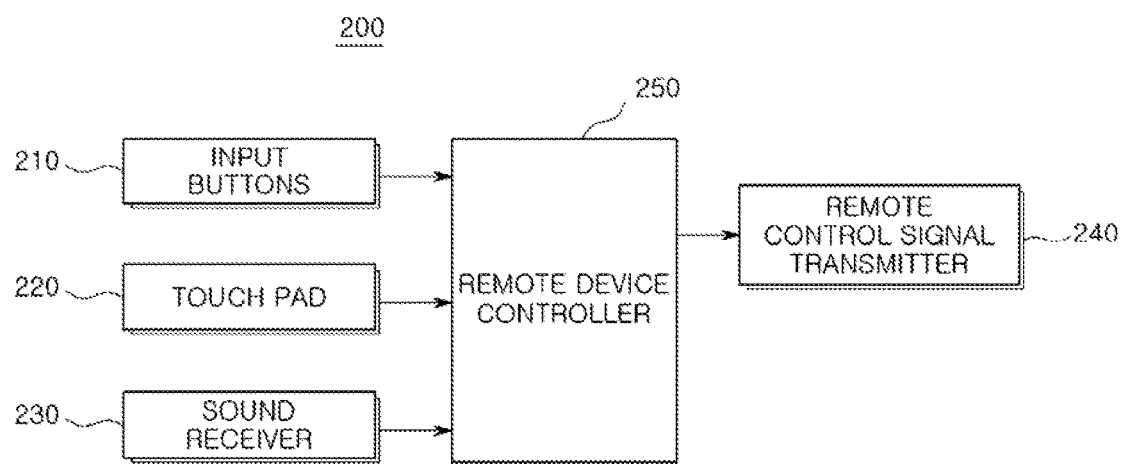
FIG. 6 illustrates a configuration of a remote device related to an image display device according to an exemplary embodiment of the disclosure.
Figure 7:
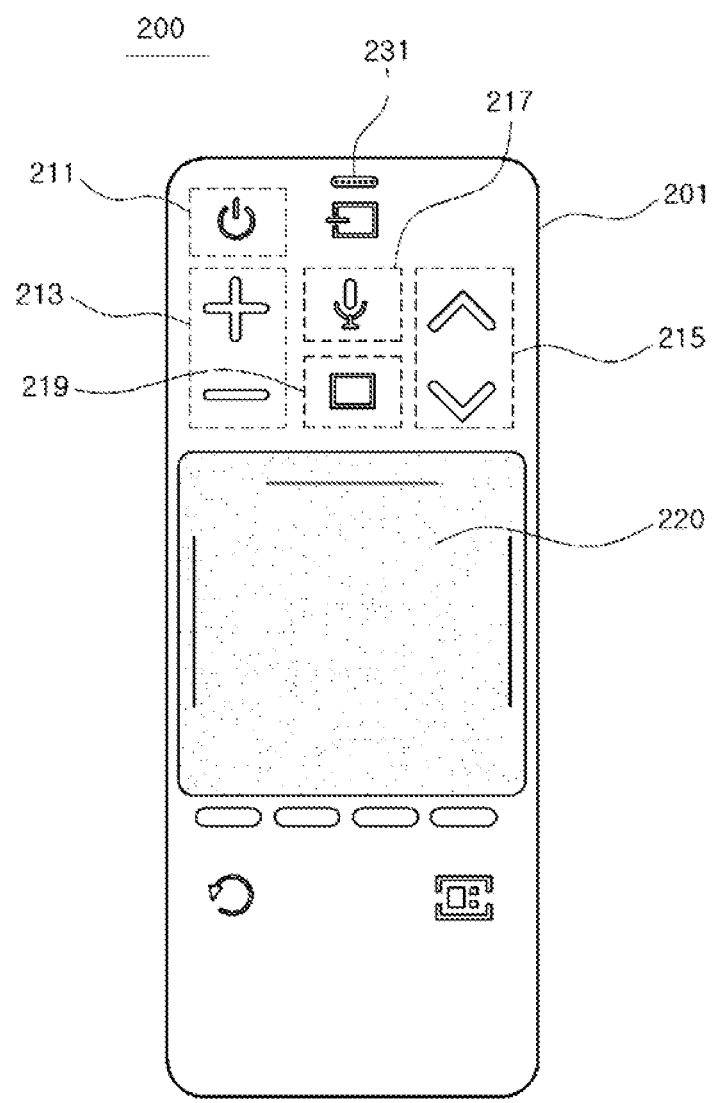
FIG. 7 illustrates an exterior of a remote device related to an image display device according to an exemplary embodiment of the disclosure.

FIG. 6 illustrates a configuration of a remote device 200 included in an image display device 10 according to an exemplary embodiment of the disclosure, and FIG. 7 illustrates an exterior of the remote device 200 included in an image display device 10 according to an exemplary embodiment of the disclosure.

Remote device 200 may be configured to allow the user 5000 to input a control command to the image display device main body 100 at a distance from the image display device main body 100. In particular, the remote device 200 receives the control command from the user 5000, and transmits the received control command to the image display device main body 100 using infrared rays, a radio wave, or the like.

The above-mentioned remote device 200, as shown in FIGS. 6 and 7, may include input buttons 210, a touch pad 220, a sound receiver 230, a remote control signal transmitter 240, and a remote device controller 250.

The input buttons 210 receive a control command from a user, and may include a power button 211 configured to turn the image display device main body 100 on or off, a volume button 213 configured to adjust a sound output from the image display device main body 100, a channel button 215 configured to change a channel of a broadcast displayed by the image display device main body 100, a voice recognition button 217 configured to recognize a voice, a user image display button 219 configured to display the user image, or the like.

Each of the buttons 211, 213, 215, and 217 may include a push switch, a membrane switch, a touch switch, or the like.

The touch pad 220 may receive various commands through a touch input of a user 5000. As an example, when the user 5000 touches the touch pad 220 with a portion of his or her body and a touch point is laterally moved, a channel of the broadcast image output from the image display device main body 100 may be changed, and when the touch point is vertically moved, the sound output from the image display device main body 100 may be changed.

The sound receiver 230 may include a microphone 231 configured to acquire an ambient sound of the image display device main body 100. The microphone 231 acquires the ambient sound near the image display device main body 100, and converts the acquired sound into the electrical sound data, and transmits the converted sound data to the remote device controller 250.

In particular, the microphone 231 may receive a control command through the voice of a user. That is, the microphone 231 may receive a voice control command of the user, and transmit the received voice control command to the remote device controller 250.

The remote control signal transmitter 240 transmits control data transmitted from the remote device controller 250 to the image display device main body 100 through infrared rays, a radio wave, or the like. In particular, the remote control signal transmitter 240 may modulate the control data in a predetermined modulation method, and transmit the modulated control signal through an infrared diode, an antenna, or the like.

The remote device controller 250 generally controls the operation of the remote device 200.

In particular, the remote device controller 250 controls the remote control signal transmitter 240 to transmit a control command input through the input buttons 210 or the touch pad 220 to the image display device main body 100. Also, the remote device controller 250 controls the remote control signal transmitter 240 to recognize a voice control command input through the sound receiver 230, and to transmit the recognized control command to the image display device main body 100.

As described above, the remote device controller 250 may generally control the operation of the remote device 200, and the operation of the remote device 200, which will be described below, may be controlled by remote device controller 250.

As described above, the image display device 10 may acquire an image through the image acquirer 120, the broadcast signal receiver 150, the communicator 190, or the like, and display the acquired image through the image outputter 160. Also, the image display device 10 may transmit the acquired image to the mobile terminal 20 through the communicator 190.

An example configuration of mobile terminal 20 is explained below.

Figure 8:
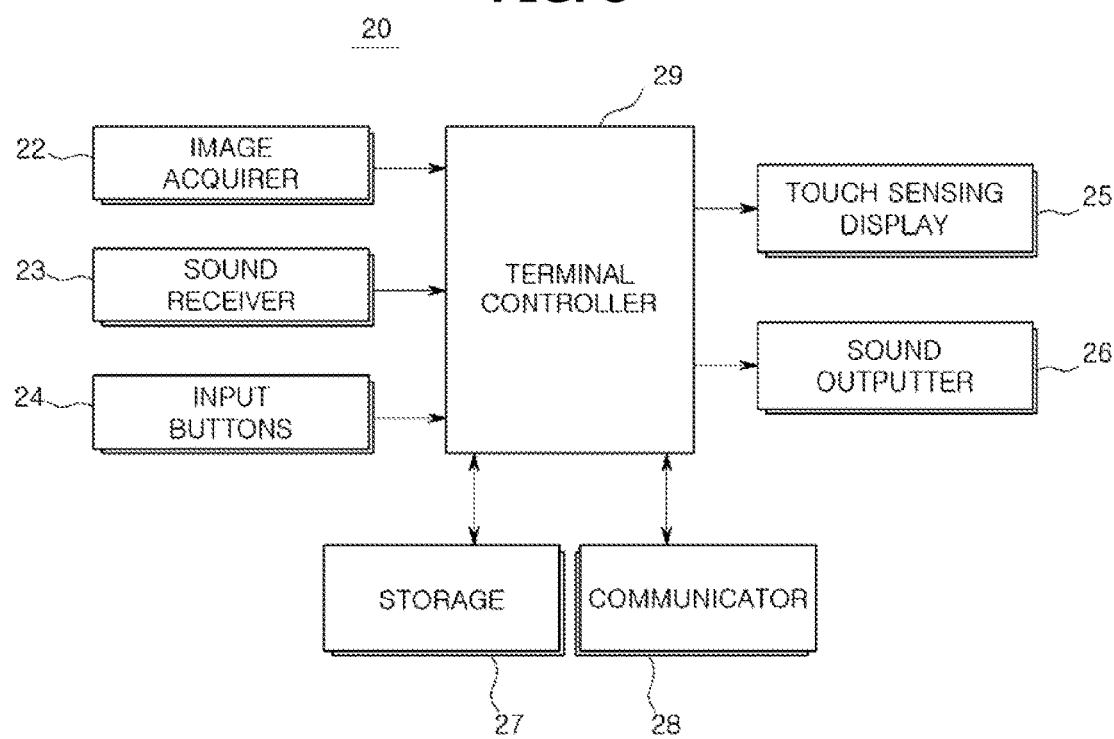
FIG. 8 illustrates a configuration of a mobile terminal included in an image system according to an exemplary embodiment of the disclosure.
Figure 9:
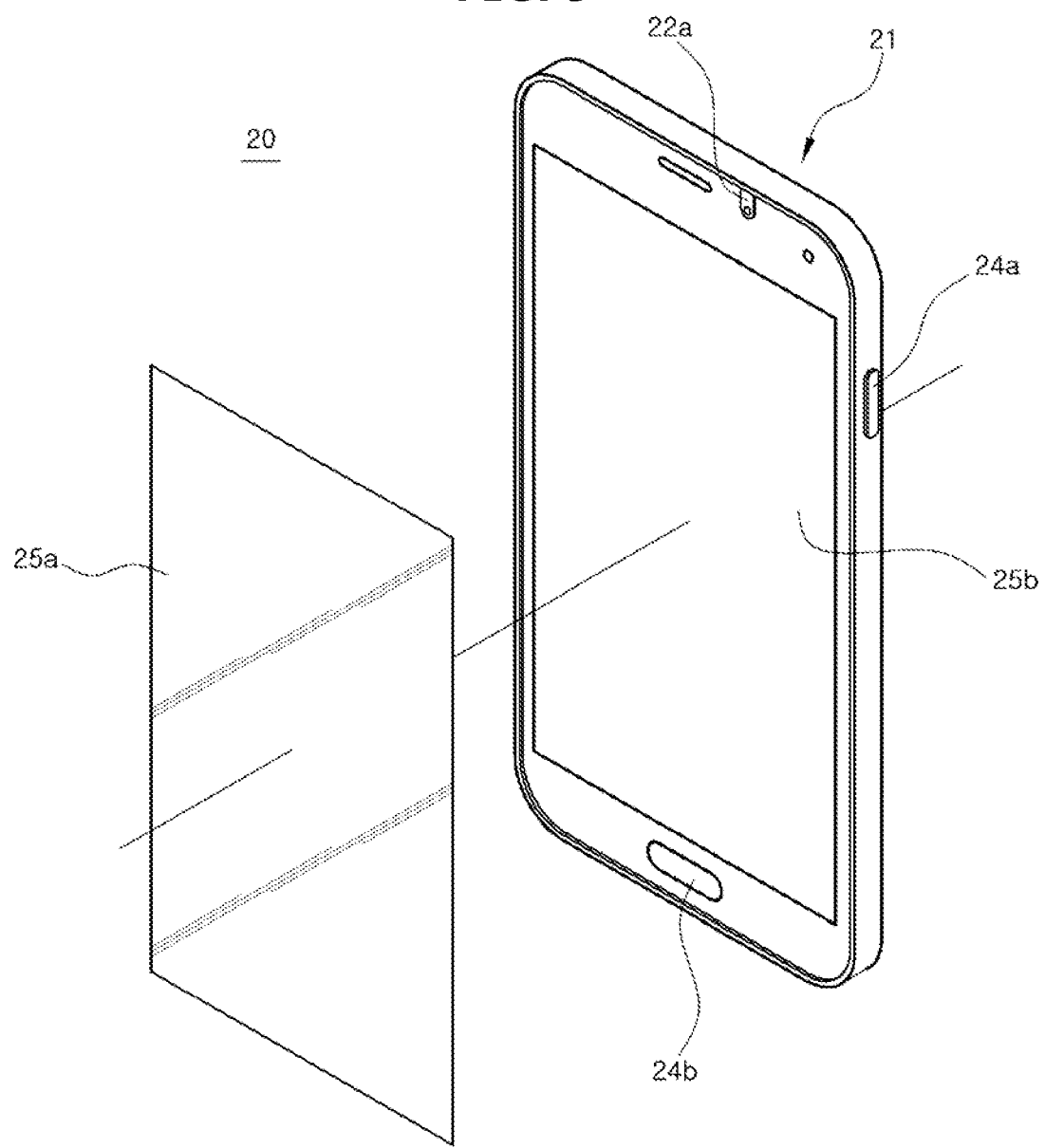
FIG. 9 illustrates an exterior of a mobile terminal included in an image system according to an exemplary embodiment of the disclosure.

FIG. 8 illustrates a configuration of a mobile terminal 20 included in an image system 1 according to one exemplary embodiment of the disclosure, and FIG. 9 illustrates an exterior of a mobile terminal 20 included in an image system 1 according to an exemplary embodiment of the disclosure.

Referring to FIGS. 8 and 9, the mobile terminal 20 includes an image acquirer 22, a sound receiver 23, input buttons 24, a touch sensing display 25, a sound outputter 26, a storage 27, a communicator 28, and a terminal controller 29.

The image acquirer 22 includes a front camera module 22a configured to acquire an image in front of the mobile terminal 20.

The front camera module 22a acquires light in front of the mobile terminal 20, and converts the acquired light into electrical image data, and transmits the converted image data to the terminal controller 29.

Also, the front camera module 22*a* may include an image sensor (not shown) configured to convert light into an electrical signal, and the image sensor may include a CCD image sensor or a CMOS image sensor.

The sound receiver 23 may include a microphone configured to acquire ambient sound near the image display device main body 100. The microphone acquires the ambient sound near the mobile terminal 20, and converts the acquired sound into the electrical sound data, and transmits the converted sound data to the terminal controller 29.

The input buttons 24 may receive a control command from a user, and can include a power button 24*a* configured to turn the mobile terminal 20 on or off, or turn the touch sensing display 25 on or off, a home button 24*b* configured to change a screen displayed on the touch sensing display 25 into an initial screen, and the like.

The touch sensing display 25 may detect a touch input of a user, and include a touch screen panel which includes a touch panel 25*a* configured to detect touch coordinates, and a display panel 25*b* configured to display an image based on the touch coordinates.

In particular, the touch sensing display 25 detects the touch coordinates of the user 5000, and transmits the detected touch coordinates to the terminal controller 29, and displays an image corresponding to the image data received from the terminal controller 29.

For example, the touch sensing display 25 may display various control command menus which may be selected by the user 5000, and receive a control command selected by the user 5000 based on the touch coordinates touched by the user 5000 in touch panel 25*a*. Also, the touch sensing display 25 may change an image displayed on the display panel 25*b* based on the control command selected by the user 5000.

The sound outputter 26 includes a speaker configured to output a sound. The speaker converts an electrical signal transmitted from the terminal controller 29 into a sound, and outputs the converted sound.

The storage 27 may store a control program and control data configured to control the mobile terminal 20, the image data and the sound data stored by the user 5000, and/or the like.

Also, the storage 27 may include a flash memory configured to store data in a semiconductor device to improve the portability of the mobile terminal 20.

The communicator 28 transmits data to the external device such as the image display device 10, or the like, and receives data from the external device. In particular, the communicator 28 modulates a signal to transmit based on a communication protocol, and transmits the modulated signal wirelessly or over wires, and receives a signal wirelessly or over wires, and demodulates the received signal.

The communicator 28 may include a WIFI communication module in communication with a local communication network through a wireless coupling device (for example, an access point), a local communication module such as a BLUETOOTH communication module, and/or the like which communicates one-to-one with a single external device or communicates one-to-many with several of the external devices.

Also, the communicator 28 may include a long distance communication module such as a time division multiple access (TDMA) communication module, a code division multiple access (CDMA) communication module, a wide code division multiple access (WCDMA) communication module, a wireless broadband (Wibro) communication module, a world interoperability for microwave access (WiMAX) communication module, a long term evolution (LTE) communication module, or the like which are in communication with a wide area network through a communication relay station, or the like.

The terminal controller 29 generally controls an operation of the mobile terminal 20.

In particular, the terminal controller 29 may control the image acquirer 22 to acquire an image, and control the touch sensing display 25 to display the image acquired by the image acquirer 22, and control the communicator 28 to transmit the image acquired by the image acquirer 22 to the image display device 10. Also, the terminal controller 29 may control the communicator 28 to receive the image from the image display device 10, and control the touch sensing display 25 to display the image received by the communicator 28.

The above terminal controller 29 may generally control the operation of the mobile terminal 20, and the operation of the mobile terminal 20, which is described below, may be controlled by the terminal controller 29.

As described above, the mobile terminal 20 may acquire an image and display the acquired image. Also, the mobile terminal 20 may transmit the acquired image to the image display device 10.

An example of the operation of the image display device 10 and the mobile terminal 20 is described below.

Figure 10:
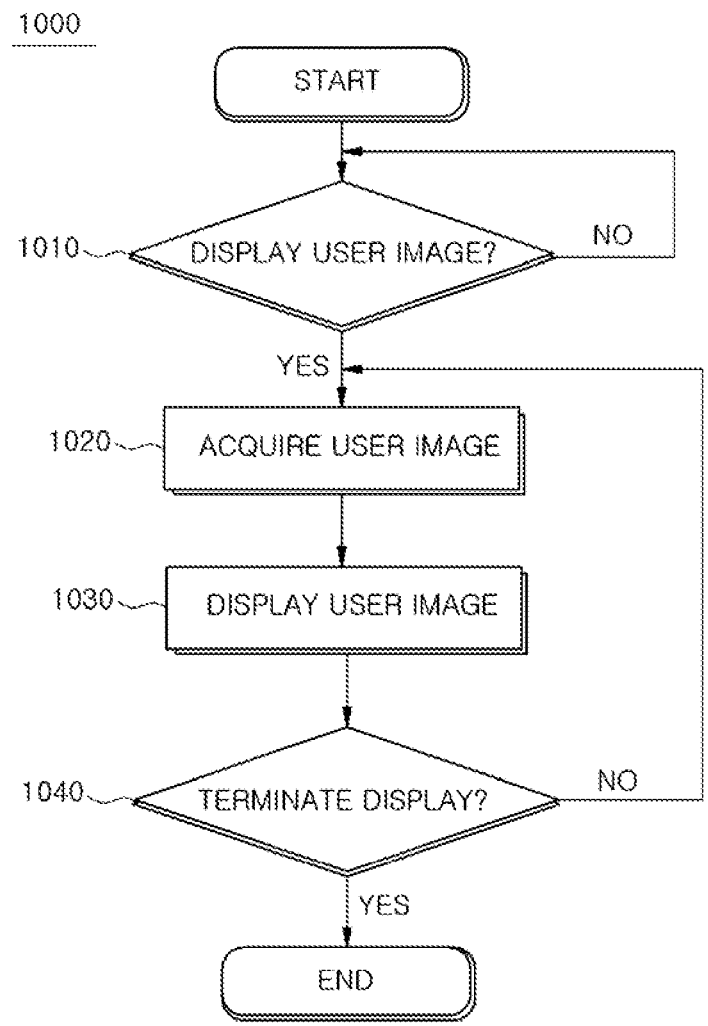
FIG. 10 illustrates one example of displaying a user image displayed by an image system according to an exemplary embodiment of the disclosure.
Figure 11:
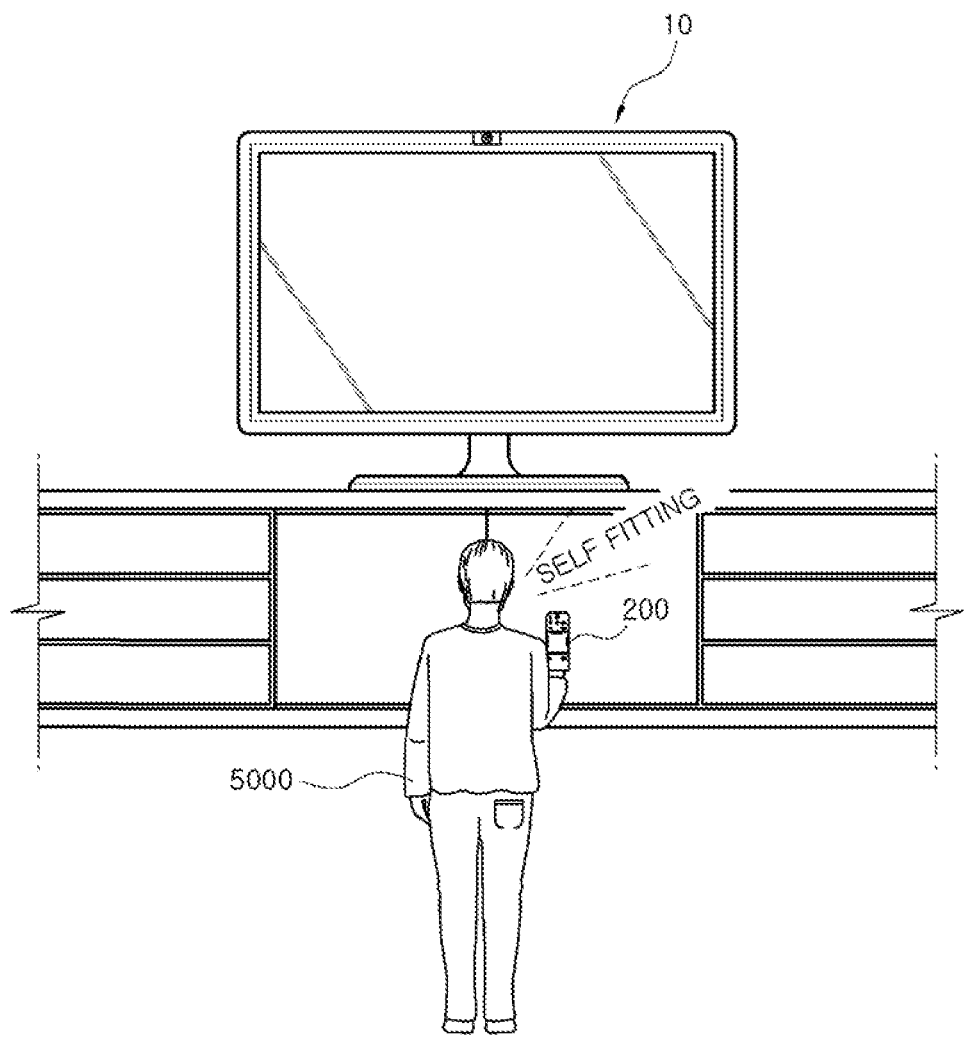
FIG. 11 illustrates one example of receiving a user image display command from a user by an image system according to an exemplary embodiment of the disclosure.

FIG. 10 illustrates one example of displaying a user image 6000 displayed by the image system 1 according to an exemplary embodiment of the disclosure, and FIG. 11 illustrates one example of receiving a user image display command from a user 5000 by the image system 1 according to an exemplary embodiment of the disclosure.

Referring to FIGS. 10 and 11, an exemplary embodiment of a user image display operation 1000, in which an image system 1 displays a user image, is described below.

The image display device 10 determines whether or not to display the user image (operation 1010).

In order to determine whether to display the user image, the image display device 10 may determine whether a user image display command has been received from the user 5000.

The user 5000 may input a user image display command to the image display device 10 using one or more of several techniques.

For example, the user 5000 may input the user image display command to the image display device 10 through the user image display button 219 provided on the remote device 200.

In another example, the user 5000 may input a voice command to display the user image as shown in FIG. 11, and the user image display command may thus be input to the image display device 10.

In particular, when the user 5000 pushes or touches the voice recognition button 217 of the remote device 200, the image display device 10 can operate in a voice recognition mode. Then, when the user 5000 inputs a user image display command, for example the phrase "self-fitting" or the like, the image display device 10 can performs the user image display operation 1000 which described below.

When it is determined that the user image should be displayed (option 'Yes' of operation 1010), the image display device 10 acquires the image of the user (operation 1020).

In order to acquire the user image 6000, the controller 110 of the image display device main body 100 may control the image acquirer 120, and thus, the camera module 121 may acquire an image in front of the image display device main body 100.

Then, the image display device 10 displays the user image 6000 (operation 1030).

The controller 110 of the image display device main body 100 converts the user image 6000 into a format which is displayable by the image outputter 160 using the graphic processor 114. Then, the controller 110 controls the image outputter 160, and thus, the user image is displayed as shown in FIG. 1.

Then, the image display device 10 determines whether to terminate the display of the user image 6000 (operation 1040).

In order to determine whether to terminate the display of the user image 6000, the image display device 10 may determine whether a user image display termination command has been received from the user 5000.

The user 5000 may input the user image display termination command to the image display device 10 using one or more of several techniques.

For example, the user 5000 may input the user image display termination command to the image display device 10 through the user image display button 219 provided in the remote device 200.

In another example, the user 5000, as shown in FIG. 11, may input a voice command of the user image display termination, and thus, the user image display termination command is input to the image display device 10.

When the user image display operation is not terminated ('No' of operation 1040), the image display device 10 repeats the acquisition of the user image 6000 and the display of the user image 6000.

When the user image display operation is terminated ('Yes' of step 1040), the image display device 10 terminates the user image display operation 1000.

As described above, the image display device 10 may acquire the user image 6000 through the image acquirer 120 provided in the image display device main body 100, and display the acquired user image 6000 through the image outputter 160 provided in the image display device main body 100.

Figure 12:
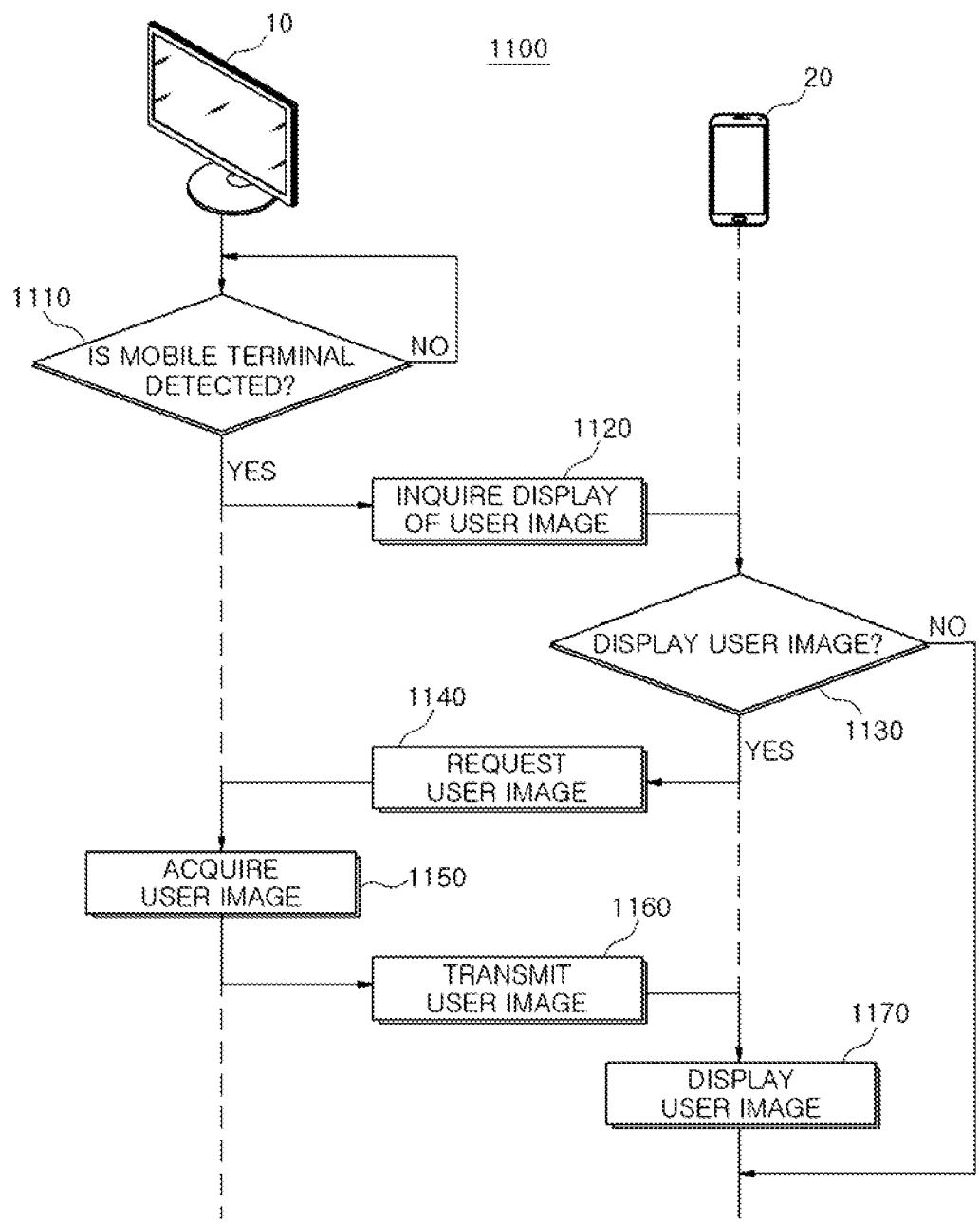
FIG. 12 illustrates another example of displaying a user image by an image system according to an exemplary embodiment of the disclosure.
Figure 13:
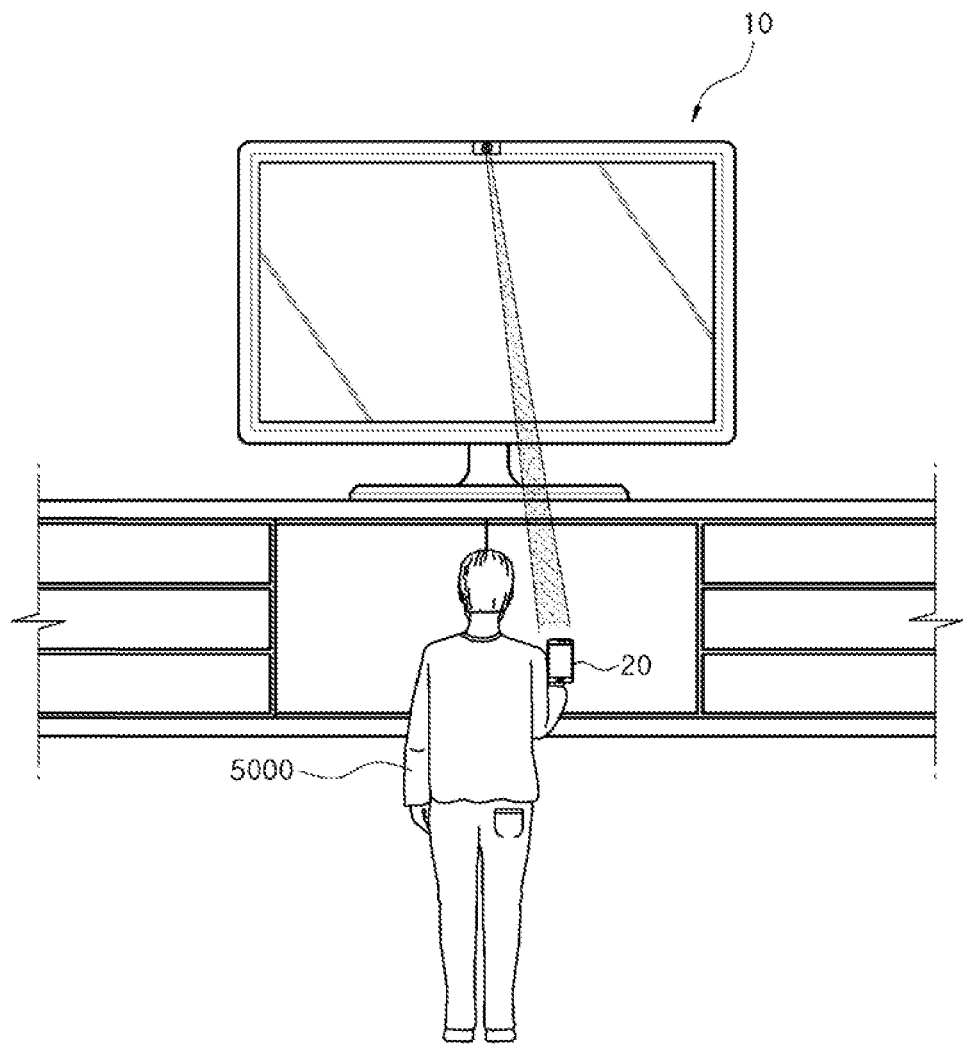
FIG. 13 illustrates another example of automatically starting a user image display command by an image system according to an exemplary embodiment of the disclosure.

FIG. 12 illustrates another example of displaying a user image 6000 by the image system 1 according to an exemplary embodiment of the disclosure, and FIG. 13 illustrates another example of automatically starting a user image display command by the image system 1 according to the exemplary embodiment of the disclosure. Also, FIG. 14 illustrating a mobile terminal which displays a user image 6000 acquired by an image display device included in the image system 1 according to an exemplary embodiment of the disclosure.

Figure 14:
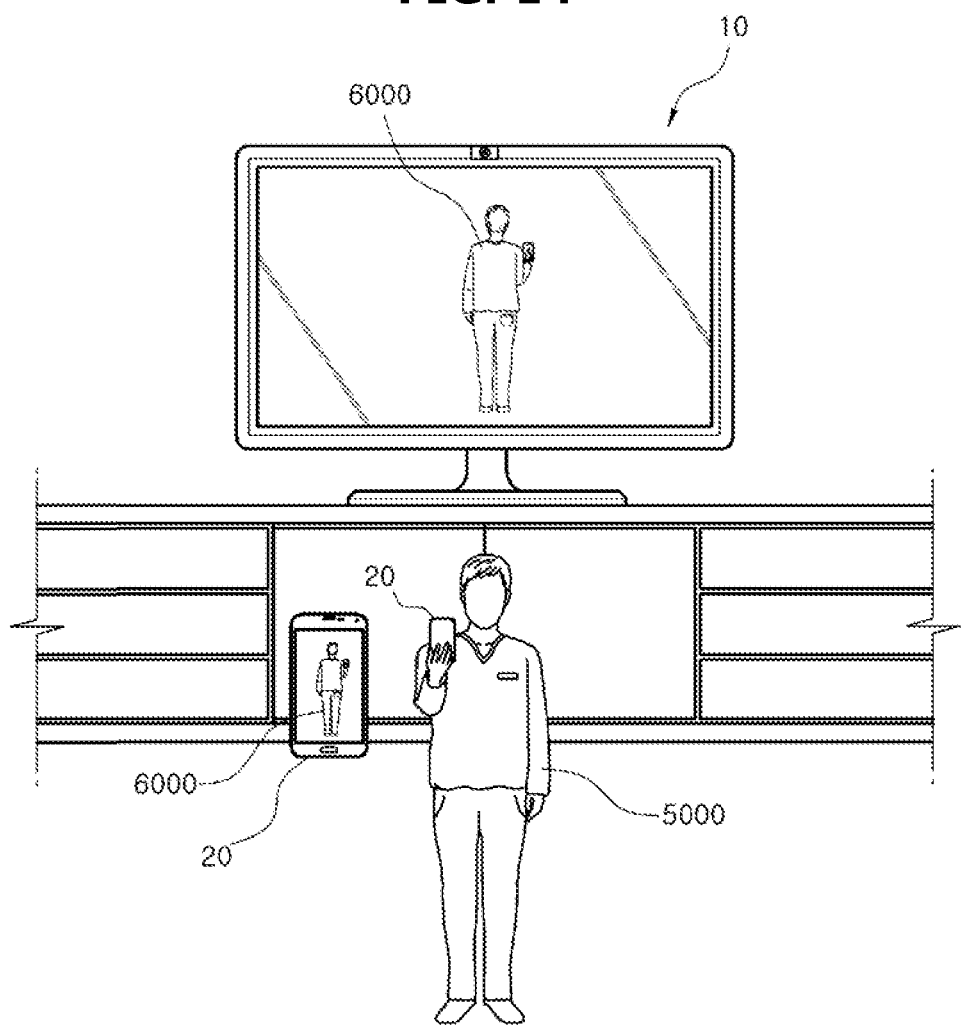
FIG. 14 illustrates a mobile terminal which displays a user image acquired by an image display device included in an image system according to an exemplary embodiment of the disclosure.

Referring to FIGS. 12, 13, and 14, another example of a user image display command 1100 will be described.

The image display device 10 determines whether the mobile terminal 20 is detected (operation 1110).

In particular, in order to determine whether the user 5000 is near the image display device 10, the image display device 10 determines whether the mobile terminal 20 is near the image display device 10.

For example, as shown in FIG. 13, the image display device 10 may acquire images in front of the image display device 10 through the image acquirer 120, and determine whether an image of the mobile terminal 20 is detected among acquired images. In particular, the image acquirer 120 compares the acquired image with an image previously stored of the mobile terminal 20, and thus, the image display device 10 determines whether the image of the mobile terminal 20 is included in the images acquired by the image acquirer 120.

In another example, the image display device 10 may detect a distance between the mobile terminal 20 and the image display device 10, and determine whether the detected distance is within a predetermined range. In particular, the image display device 10 may transmit a message through the communicator 190 of the image display device 10 to calculate the distance, and detect the distance between the mobile terminal 20 and the image display device 10 based on a receiving intensity of the received message by the mobile terminal 20 or a response time of the mobile terminal 20.

When the mobile terminal 20 is detected ('Yes' of operation 1110), the image display device 10 inquires whether to display the user image on the mobile terminal 20 (operation 1120).

Since the user 5000 may access the image display device 10 to watch a broadcast image, the image display device 10 may transmit a user image display inquiry message to the mobile terminal 20 so as to verify a decision of the user 5000 although the mobile terminal 20 is detected.

The mobile terminal 20 which has received the user image display inquiry message then determines whether to display the user image (operation 1130).

For example, the mobile terminal 20 may inquire whether to display the user image 6000 in directly from the user 5000 through the touch sensing display 25.

In another example, the mobile terminal 20 may determine whether to display the user image based on the acquisition of the image of the user 5000 through the front camera module 22a included in the image acquirer 22.

When the user image is determined to be displayed ('Yes' of operation 1130), the mobile terminal 20 requests the user image from the image display device 10 (operation 1140).

For example, when the user 5000 commands the mobile terminal 20 to display the image in response to the user image display inquiry of mobile terminal 20, then mobile terminal 20 may request the user image from the image display device 10 through a communicator 28.

In another example, when the mobile terminal 20 is acquiring the image of the user U through the front camera module 22a, the mobile terminal 20 may request the user image in the image display device 10 through the communicator 28. This is because it is determined that the user is verifying the user image 6000.

The image display device 10 which has received the user image request acquires the image of the user (operation 1150).

The controller 110 of the image display device main body 100 may control the image acquirer 120, and thus, the camera module 121 included in the image acquirer 120 may acquire the image in front of the image display device main body 100.

Then, the image display device 10 transmits the user image data to the mobile terminal 20 (operation 1160).

The controller 110 of the image display device main body 100 may convert the user image 6000 into user image data which is transferable to the mobile terminal 20 by the communicator 190 using the graphic processor 114, and the controller 110 may control the communicator 190 to transmit the user image data to the mobile terminal 20.

Also, the image display device 10 may display the user image 6000. That is, the image display device 10 may transmit the user image data to the mobile terminal 20 so as to display the user image 6000 on the mobile terminal 20, and simultaneously display the user image 6000.

The mobile terminal 20 which has received the user image data displays the user image 6000 (operation 1170).

The terminal controller 29 of the mobile terminal 20 may convert the user image data into the user image 6000 which is displayable by the touch sensing display 25, and control the touch sensing display 25 so as to display the user image 6000.

The mobile terminal 20 may display the user image 6000 as shown in FIG. 14. Also, as shown in FIG. 14, the image display device 10 together with the mobile terminal 20 may display the user image 6000.

As described above, when the mobile terminal 20 displays the user image 6000 acquired by the image display device 10, the user 5000 may view his or her posterior through the mobile terminal 20 as shown in FIG. 14.

Figure 15:
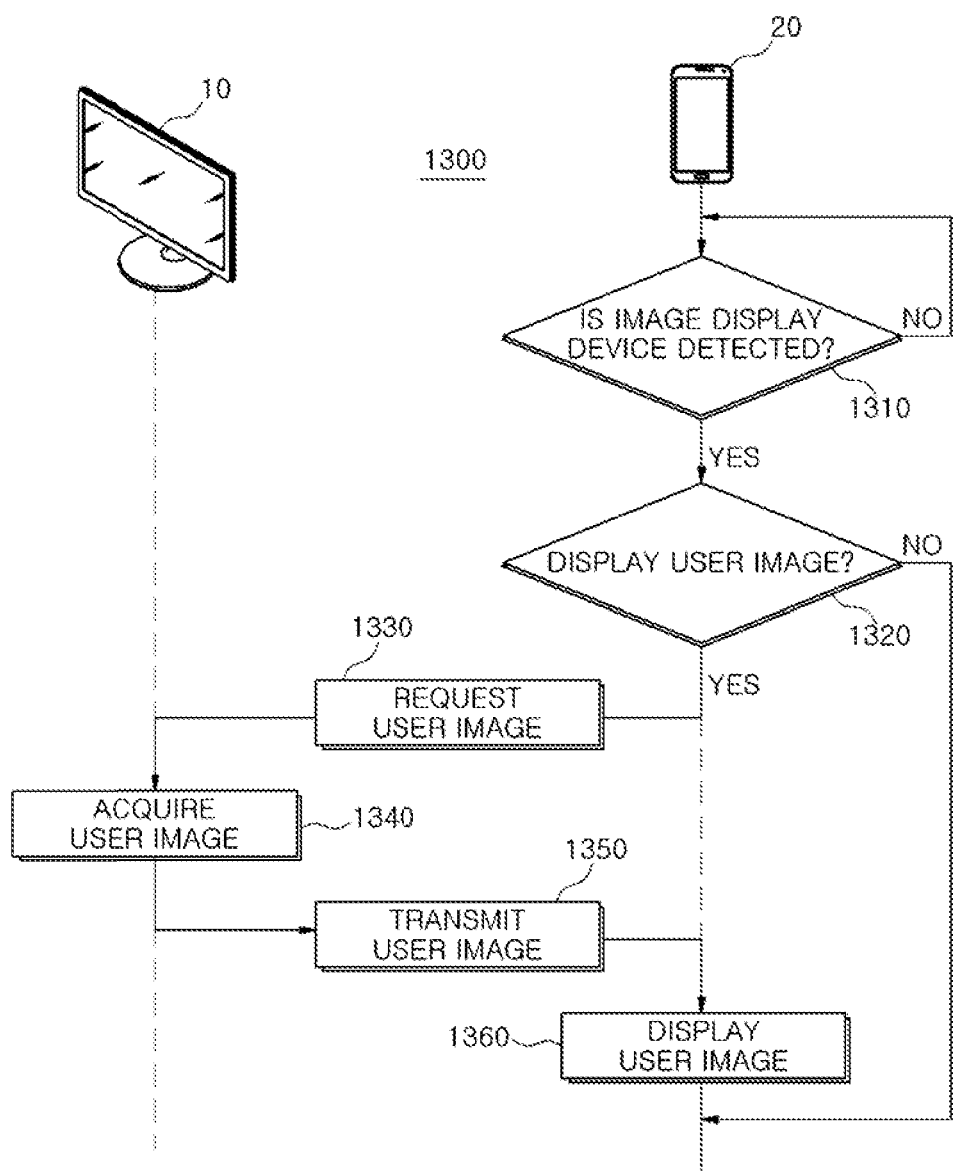
FIG. 15 illustrates still another example of displaying a user image by an image system according to an exemplary embodiment of the disclosure.
Figure 16:
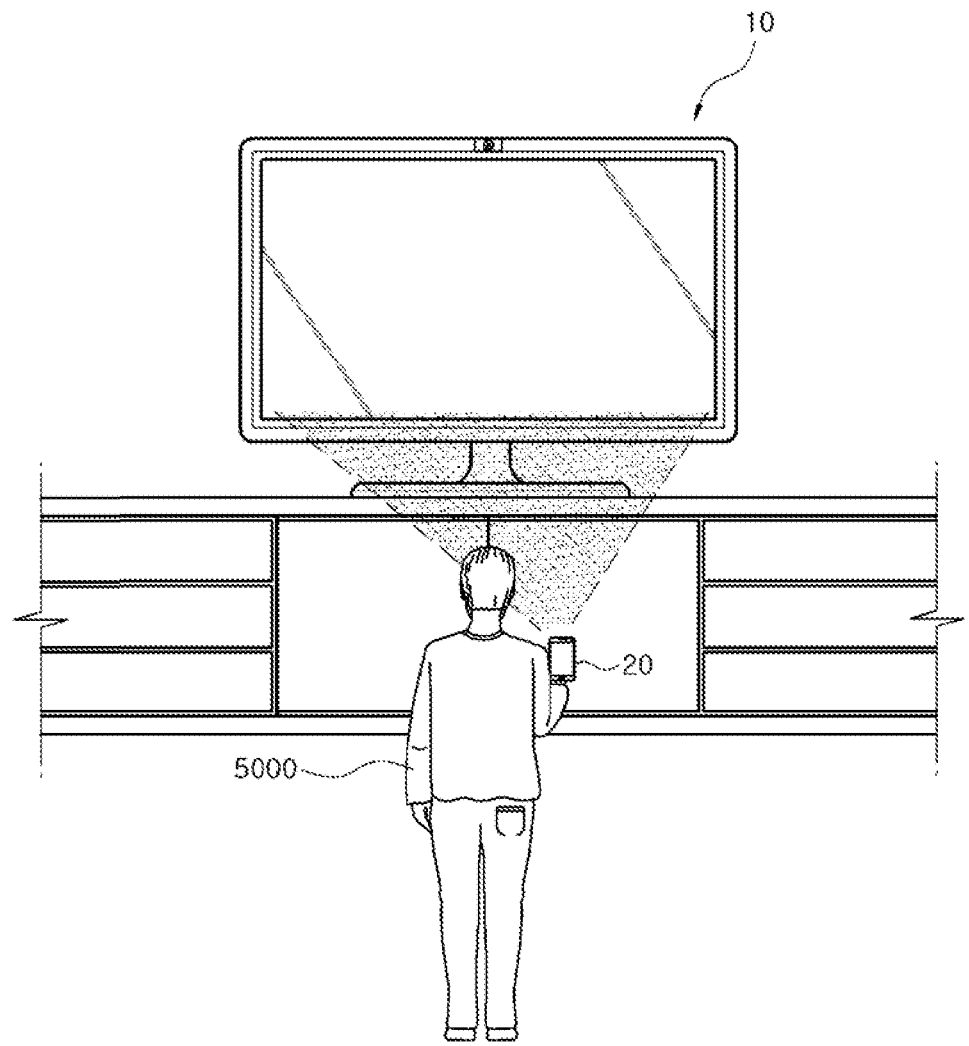
FIG. 16 illustrates yet another example of automatically starting a user image display command by an image system according to an exemplary embodiment of the disclosure.

FIG. 15 illustrates still another example of displaying a user image 6000 by the image system 1 according to an exemplary embodiment, and FIG. 16 illustrates yet another example of automatically starting a user image display command by the image system 1 according to the exemplary embodiment of the disclosure.

Referring to FIGS. 15 and 16, a user image display operation 1300 according to still another exemplary embodiment which displays the user image 6000 by the image system 1 will be described.

The mobile terminal 20 determines whether the image display device 10 is detected (operation 1310).

In particular, in order to determine whether the image display device 10 is near the user 5000, the mobile terminal 20 may determine whether the image display device 10 is near the mobile terminal 20.

For example, as shown in FIG. 16, the mobile terminal 20 may acquire an image through the image acquirer 22, and determine whether an image of the image display device 10 is detected among the acquired images.

In another example, the mobile terminal 20 may detect a distance between the image display device 10 and the mobile terminal 20, and determine the detected distance is smaller than or equal to a preset distance.

When the image display device 10 is detected ('Yes' of operation 1310), the mobile terminal 20 determines whether to display the user image (operation 1320).

For example, the mobile terminal 20 may inquire whether to display the user image directly from the user 5000 through the touch sensing display 25.

In another example, the mobile terminal 20 may determine whether to display the user image based on the acquisition of the image of the user 5000 through the front camera module 22a included in the image acquirer 22.

When it is determined that the user image 6000 should be displayed ('Yes' of operation 1320), the mobile terminal 20 requests the user image 6000 from the image display device 10 (operation 1330).

For example, when the user 5000 commands the mobile terminal 22 to display the user image 6000 or the image of the user 5000 is acquired through the front camera module 22a, the mobile terminal 20 may request the user image 6000 from the image display device 10 through the communicator 28.

The image display device 10 which has requested the user image acquires the image of the user (operation 1340).

The controller 110 of the image display device main body 100 may control the image acquirer 120, and thus, the camera module 121 included in the image acquirer 120 may acquire the image in front of the image display device main body 100.

Then, the image display device 10 transmits the user image data to the mobile terminal 20 (operation 1350).

The controller 110 of the image display device main body 100 may convert the user image 6000 into the user image data which is transferable to the mobile terminal 20 by the communicator 190, and the controller 110 may control the communicator 190 to transmit the user image data to the mobile terminal 20.

The mobile terminal 20 which has received the user image data displays the user image 6000 (operation 1360).

The terminal controller 29 of the mobile terminal 20 may convert the user image data into the user image 6000 which is displayable by the touch sensing display 25, and control the touch sensing display 25 to display the user image 6000.

The image display device 10 may display the user image 6000 acquired through the image acquirer 120 on the image outputter 160 in real time, and also, store the user image 6000, and replay the stored user image 6000.

Figure 17:
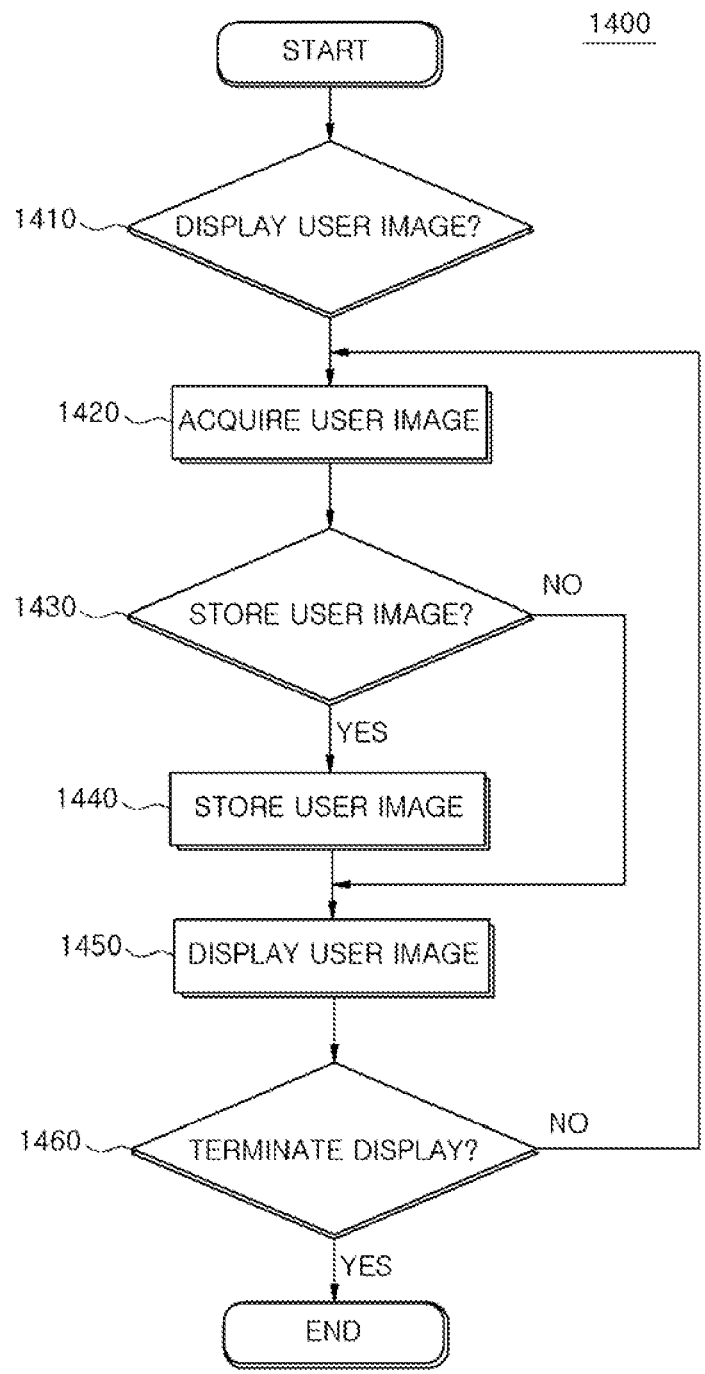
FIGS. 17 and 18 illustrate one example of a user image storage operation configured to store a user image by an image system according to an exemplary embodiment of the disclosure.
Figure 18:
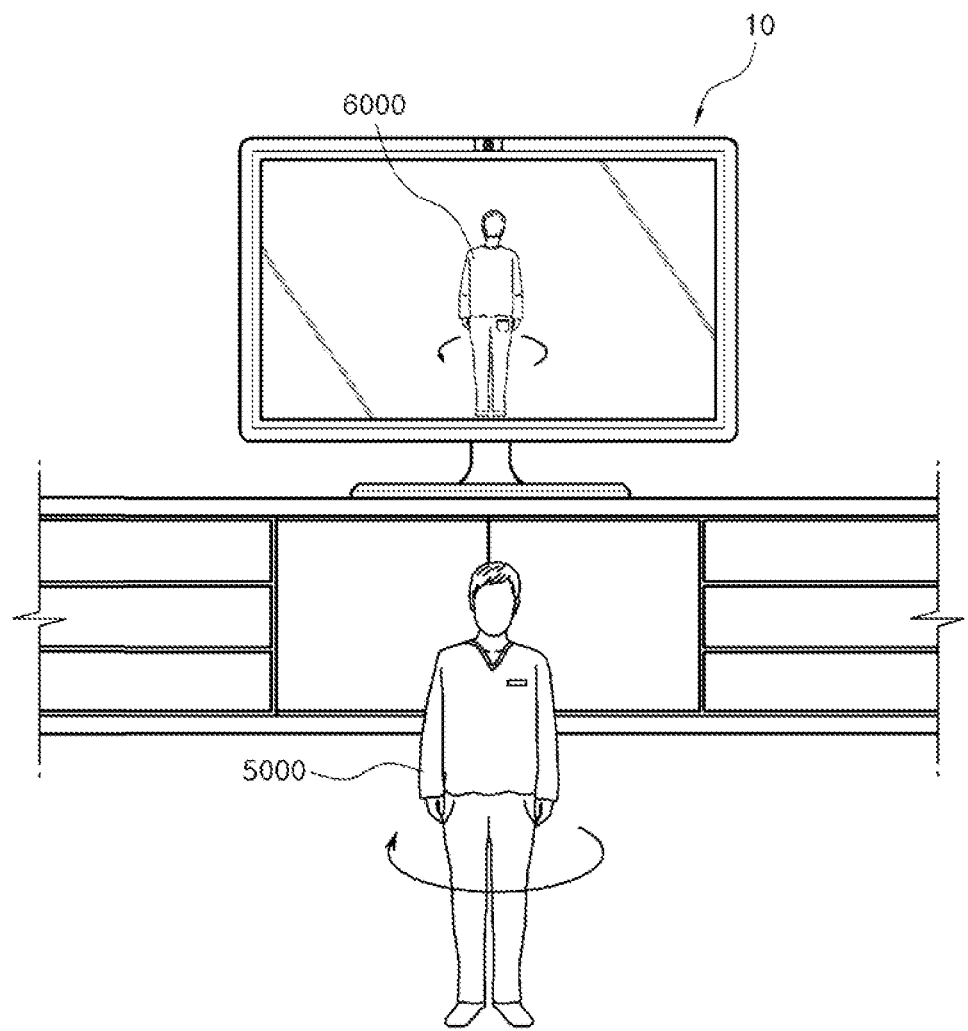

FIGS. 17 and 18 illustrate one example of a user image storage operation configured to store a user image by the image system according to an exemplary embodiment.

Referring to FIGS. 17 and 18, an example of a user image storage operation 1400 will be described.

Any detailed description concerning the same operation as the above-described user image display operation is omitted.

The image display device 10 determines whether to display the user image (operation 1410). In order to determine whether to display the user image, the image display device 10 may determine whether the user image display command is received from the user 5000.

When it is determined that the user image 6000 should be displayed ('Yes' of operation 1410), the image display device 10 acquires the image of the user 5000 (operation 1420).

In order to acquire the user image 6000, the controller 110 of the image display device main body 100 may control the image acquirer 120, and thus, the camera module 121 may acquire the image in front of the image display device main body 100.

Then the image display device 10 determines whether to store the acquired user image 6000 (operation 1430).

In order to determine whether to store the user image 6000, the image display device 10 may determine whether a user image storage command has been received from the user 5000.

The user 5000 may input the user image storage command in the image display device 10 using one or more of several techniques.

For example, the user 5000 may input the user image storage command in the image display device 10 through the remote device 200, or input a voice command to store the user image 6000, and thus, the user image storage command may be input to the image display device 10.

When it is determined that the user image 6000 should be stored ('Yes' of operation 1430), the image display device 10 stores the user image 6000 (operation 1440).

The controller 110 of the image display device main body 100 converts the user image 6000 into user image data which is storable in the storage 180 using the graphic processor 114. Then, the controller 110 controls the storage 180 to store the user image 6000.

For example, as shown in FIG. 18, when the user 5000 rotates by 360 degrees in front of the image display device 10, the image display device 10 may store a front view image, a side view image, and a rear view image of the user 5000.

Then, the image display device 10 displays the user image 6000 (operation 1450).

The controller 110 of the image display device main body 100 converts the user image 6000 into a format which is displayable by the image outputter 160 using the graphic processor 114. Then, the controller 110 controls the image outputter 160, and thus, as shown in FIG. 1, the user image 6000 is displayed.

When it is determined that the user image 6000 should not be stored ('No' of 1430), the image display device 10 displays the user image 6000 without storing the user image 6000.

Next the image display device 10 determines whether to terminate the display of the user image 6000 (operation 1460). In order to determine whether to terminate the display of the user image 6000, the image display device 10 may determine whether the user image display termination command has been received from the user 5000.

When the user image display command is not to be terminated ('No' of operation 1460), the image display device 10 repeats acquisition, storage, and display of the user image 6000.

When the user image display command is to be terminated ('Yes' of operation 1460), the image display device 10 terminates the acquisition, the storage, and the display of the user image 6000.

As described above, the image display device 10 may acquire the user image 6000, and store the acquired user image 6000 in the storage 180 and simultaneously display the acquired user image 6000 on the image outputter 160.

Figure 19:
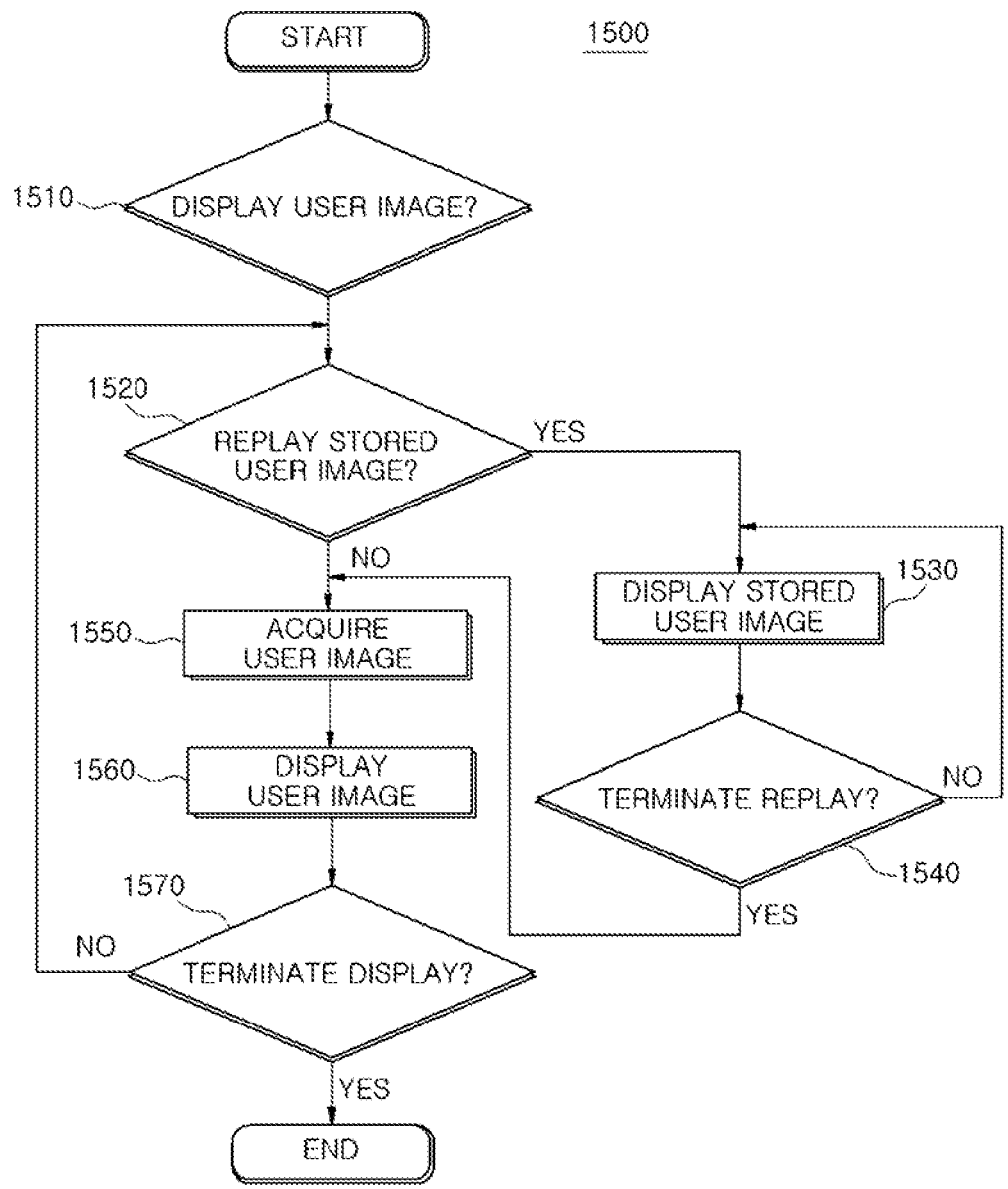
FIGS. 19 and 20 illustrate one example of a user image replay operation configured to play the stored user image by an image system according to an exemplary embodiment of the disclosure.
Figure 20:
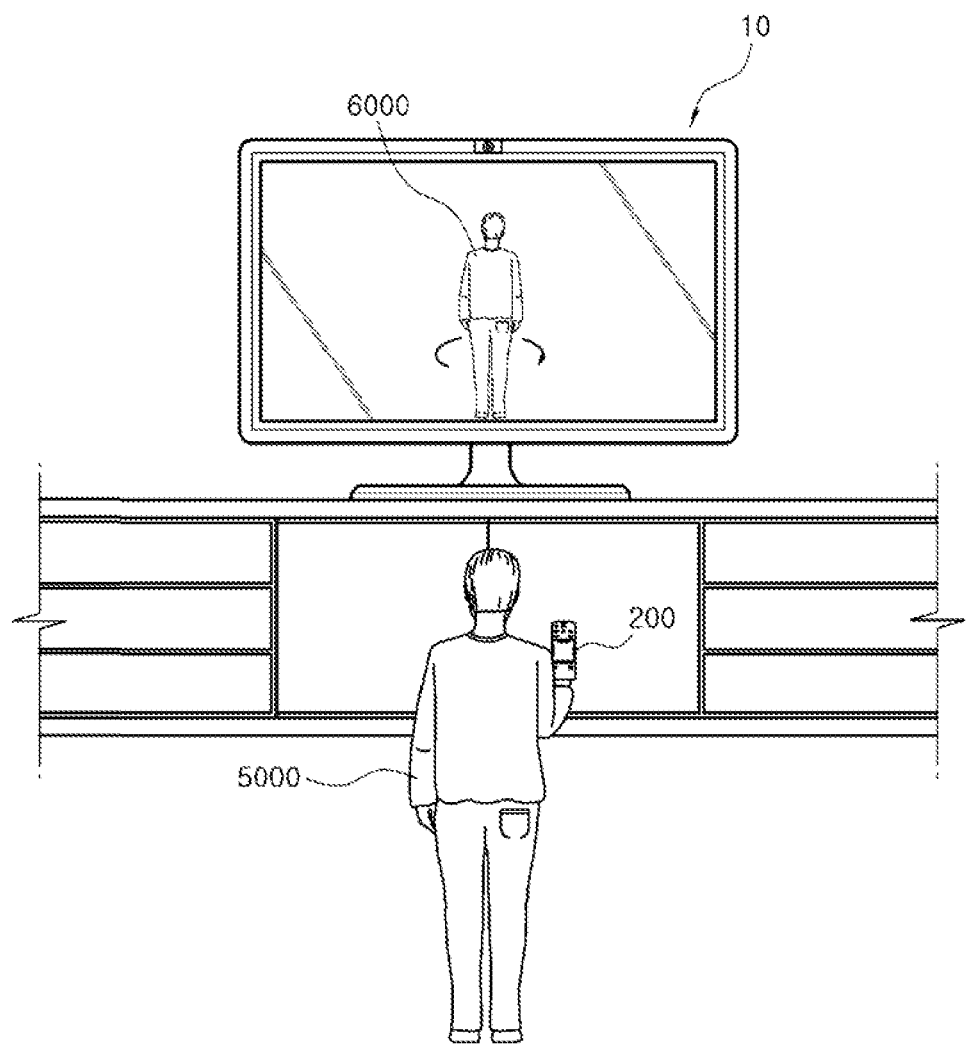

FIGS. 19 and 20 illustrate one example of a user image replay operation configured to replay the stored user image by the image system according to an exemplary embodiment.

Referring to FIGS. 19 and 20, an example of a user image replay operation 1500 is described below.

Detailed description concerning operations the same as the above-described user image display operation and the user image storage operation will be omitted.

The image display device 10 determines whether to display the user image (1510). In order to determine whether to display the user image, the image display device 10 may determine whether the user image display command has been received from the user 5000.

When it is determined that a user image should be displayed ('Yes' of operation 1510), the image display device 10 determines whether to replay a previously stored user image (operation 1520).

In order to determine the replay of the previously stored user image, the image display device 10 may determine whether a user image replay command has been received from the user 5000.

The user 5000 may input the user image storage command in the image display device 10 using one or more of several techniques.

For example, the user 5000 may input the user image replay command in the image display device 10 through the remote device 200, or input the voice command to replay the user image, and thus, the user image replay command is input to the image display device 10.

When it is determined that the previously stored user image should be replayed ('Yes' of operation 1520), the image display device 10 displays the previously stored user image stored in the storage 180 (operation 1530).

The controller 110 of the image display device main body 100 converts the user image data stored in the storage 180 into the previously stored user image which is displayable on the image outputter 160 using the graphic processor 114. Then, the controller 110 controls the image outputter 160, and thus, the previously stored user image is replayed.

For example, as shown in FIG. 20, when the previously stored user images in which the user 5000 rotates in an angle of 360 degrees is stored in the storage 180, the previously stored user images including a front view image, a side view image, and a rear view image of the user 5000 may be displayed on the image outputter 160.

Then, the image display device 10 determines whether to terminate the replay of the previously stored user image (1540).

When it is determined that the replay of the previously stored user image should not be terminated ('No' of operation 1540), the previously stored user image continues replaying.

When it is determined that the replay of the previously stored user image should be terminated ('Yes' of operation 1540) or the previously stored user image is not to be replayed ('No' of Operation 1520), the image display device 10 acquires the user image 6000 (operation 1550).

In order to acquire the user image 6000, the controller 110 of the image display device main body 100 may control the image acquirer 120, and thus, the camera module 121 may acquire the image in front of the image display device main body 100.

Then, the image display device 10 displays the acquired user image 6000 (1560).

The controller 110 of the image display device main body 100 converts the user image 6000 into a format in which the user image 6000 may be displayable on the image outputter 160 using the graphic processor 114. Then, the controller 110 controls the image outputter 160, and thus, the user image is displayed as shown in FIG. 1.

Then, the image display device 10 determines whether to terminate the display of the user image 6000 (1570).

In order to determine whether to terminate display of the user image 6000, the image display device 10 may determine whether the user image display termination command has been received from the user 5000.

When it is determined that the user image display operation should not be terminated ('No' of operation 1460), the image display device 10 repeats the play, the acquisition, and the display of the user image 6000.

When it is determined that the user image display operation should be terminated ('Yes' of operation 1460), the image display device 10 terminates the replay operation and the display operation of the user image 6000.

As described above, the image display device 10 may display a previously stored user image stored in the storage 180 on the image outputter 160.

In some exemplary embodiments, the image system 1 may extract an image of the clothing worn by the user while the user image 6000 is displayed, and store the extracted clothing image. Also, the image system 1 may overlap the user image and the clothing image and display the overlapped images when desired by the user.

FIGS. 21, 22, and 23 illustrate one example of a clothing image storage operation configured to extract and store a clothing image from a user image 6000 by the image system 1 according to an exemplary embodiment.

Referring to FIGS. 21, 22, and 23, a clothing image storage operation (1600) is described below.

Detailed description concerning the same operations as the above-described user image display operation, the user image storage operation, and the user image replay operation will be omitted.

The image display device 10 determines whether to display the user image (operation 1610). In order to determine whether to display the user image, the image display device 10 may determine whether the user image display command has been received from the user 5000.

When it is determined that the user image 6000 is determined should be displayed ('Yes' of operation 1610), the image display device 10 acquires the image of the user (operation 1620). In order to acquire the user image 6000, the controller 110 of the image display device main body 100 may control the image acquirer 120, and thus, the camera module 121 may acquire the image in front of the image display device main body 100.

Then, the image display device 10 determines whether to store the clothing image 7000 (operation 1630). In order to determine whether to store the clothing image 7000, the image display device 10 may determine whether the clothing image storage command has been received from the user 5000.

The user 5000 may input the clothing image storage command in the image display device 10 using one or more of several different techniques. For example, the user 5000 may input the clothing image storage command in the image display device 10 through the remote device 200, or input the voice command to store the clothing image, and thus, the clothing image storage command may be input to the image display device 10.

When it is determined that the clothing image 7000 should be stored ('Yes' of operation 1630), the image display device 10 determines a direction in which the user 5000 faces (1640). In particular, the image display device 10 analyses the user image 6000 acquired by the image acquirer 120, and determines the direction in which a body of the user 5000 faces.

For example, the controller 110 of the image display device main body 100 may identify a shoulder of the user 5000 included in the user image 6000, and determine the direction in which the body of the user 5000 faces based on a direction in which the shoulder of the user 5000 faces.

Then, the image display device 10 extracts the clothing image 7000 from the user image 6000 (operation 1650).

For example, the image display device 10 may extract outlines of the body, an arm, and a leg of the user 5000 from the user image 6000 using an outline extraction algorithm, and extract images of the body, the arm, and the leg of the user 5000 from the user image 6000 using the outline of the body, the arm, and the leg of the user 5000. Also, the image display device 10 may extract a clothing image 7000 from the images of the body, the arm, and the leg of the user 5000 using a difference between a skin color of the user 5000 and a color of the clothing.

Figure 22A:
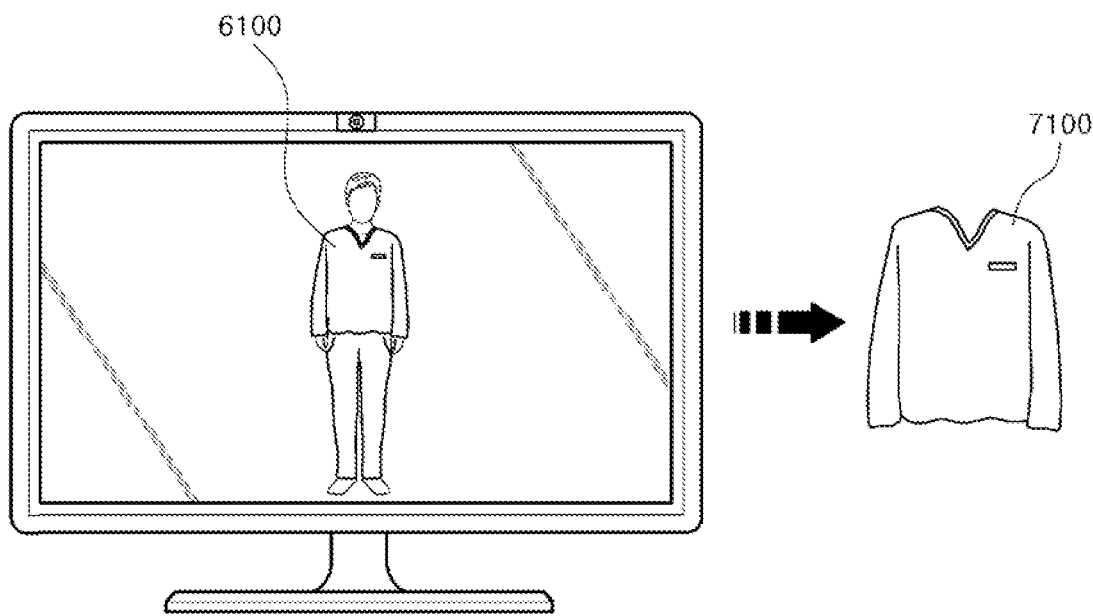
Figure 22B:
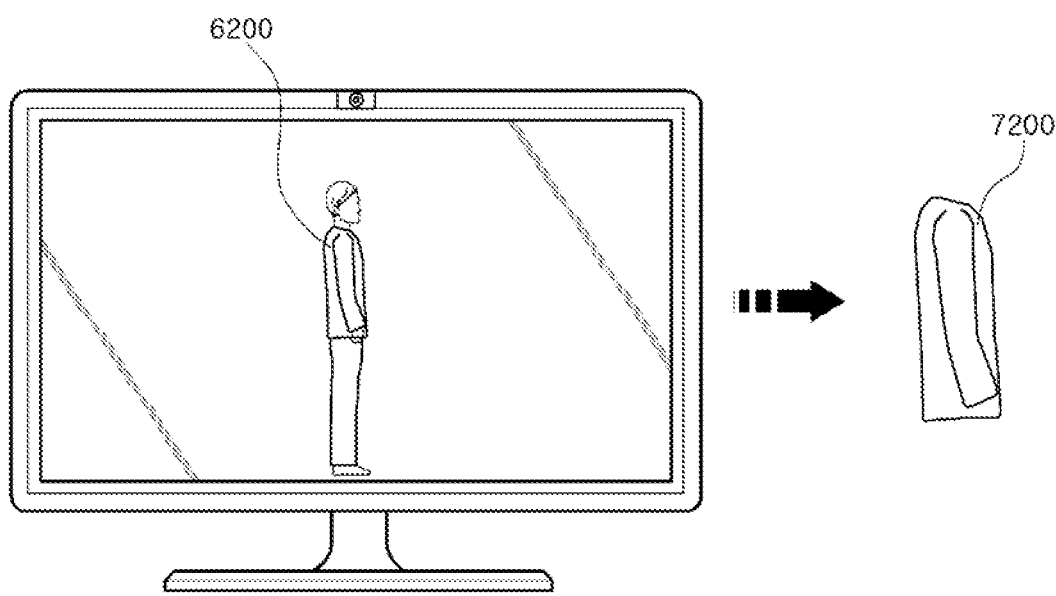

For example, the image display device 10, as shown in FIG. 22(A), may extract a front image 7100 of the clothing from a front image 6100 of the user, and as shown in FIG. 22(B), may extract a right side image 7200 of the clothing from a right side image 6200 of the user.

Figure 23A:
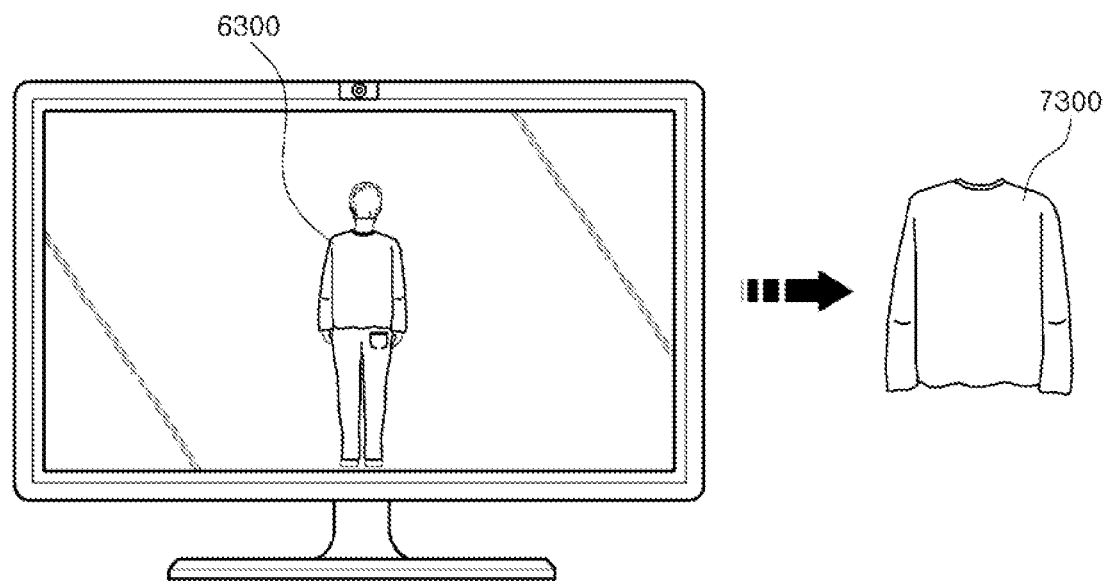
Figure 23B:
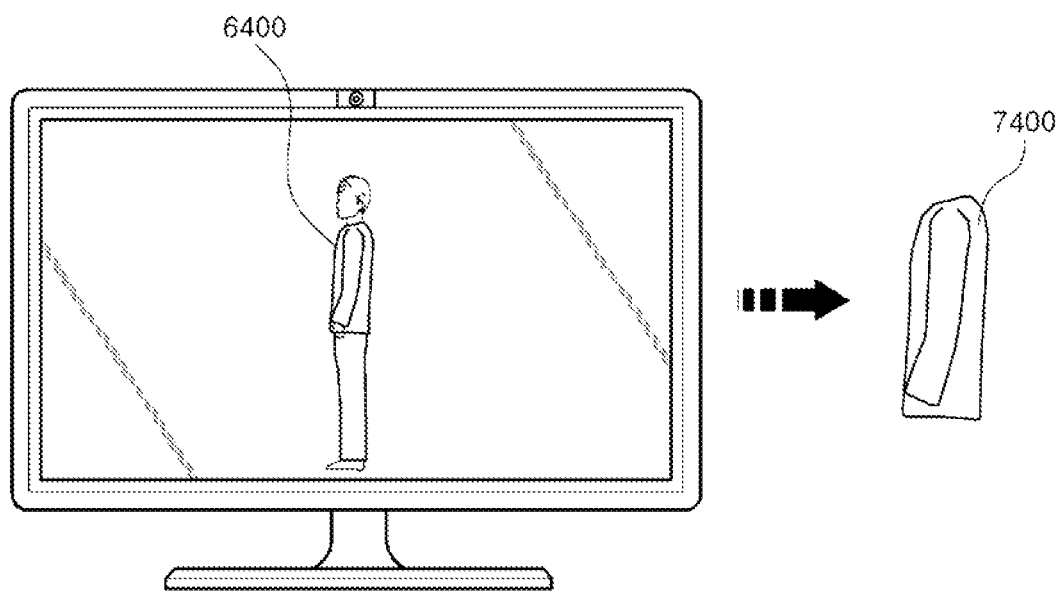

Also, the image display device 10, as shown in FIG. 23(A), may extract a rear image 7300 of the clothing from a rear image 6300 of the user, and as shown in FIG. 23(B), may extract a left side image 7400 of the clothing from a left side image 6400 of the user.

Then, the image display device 10 stores the clothing image 7000 in the storage 180 (operation 1660). In particular, the direction, in which the user 5000 faces, corresponds to the clothing image 7000, and the image display device 10 stores the clothing image 7000.

For example, the direction in which the user 5000 faces toward the image display device 10 may correspond to the clothing image 7000 and the image display device 10 may store the clothing image 7000 with respect to the direction of the user 5000 facing the image display device 10.

The front image 7100 of the clothing extracted from the front image 6100 of the user may correspond to "0 degrees" and may be stored, and the right side image 7200 of the clothing, which is extracted from the right side image 6200 of the user, may correspond to "−90 degrees" and be stored. Also, the rear image 7300 of the clothing, which is extracted from the rear image 6300 of the user may correspond to "−180 degrees" or "+180 degrees" and be stored, and the left side image 7400 of the clothing, which is extracted from the left side image 6400 of the user, may correspond to "+90 degrees" and be stored.

Then, the image display device 10 displays the user image 6000 (1670). The controller 110 of the image display device main body 100 may convert the user image 6000 into the format which is displayable on the image outputter 160 using the graphic processor 114. Then, the controller 110 may control the image outputter 160, and thus, the user image may be displayed.

Then, the image display device 10 determines whether to terminate the display of the user image 6000 (operation 1680). In order to determine the termination of the display of the user image 6000, the image display device 10 may determine whether the user image display termination command has been received from the user 5000.

When it is determined that the display of the user image should not be terminated ('No' of operation 1680), the image display device 10 repeats the acquisition and the display of the user image 6000, and the extraction and the storage of the clothing image 7000.

When it is determined that the user image display should be terminated ('Yes' of operation 1680), the image display device 10 terminates the acquisition and the display of the user image 6000, and the extraction and the storage of the clothing image 7000.

As described above, the image display device 10 may extract a clothing image 7000 from the user image 6000 in the direction in which the user 5000 faces, and store the extracted clothing image 7000.

Figure 24:
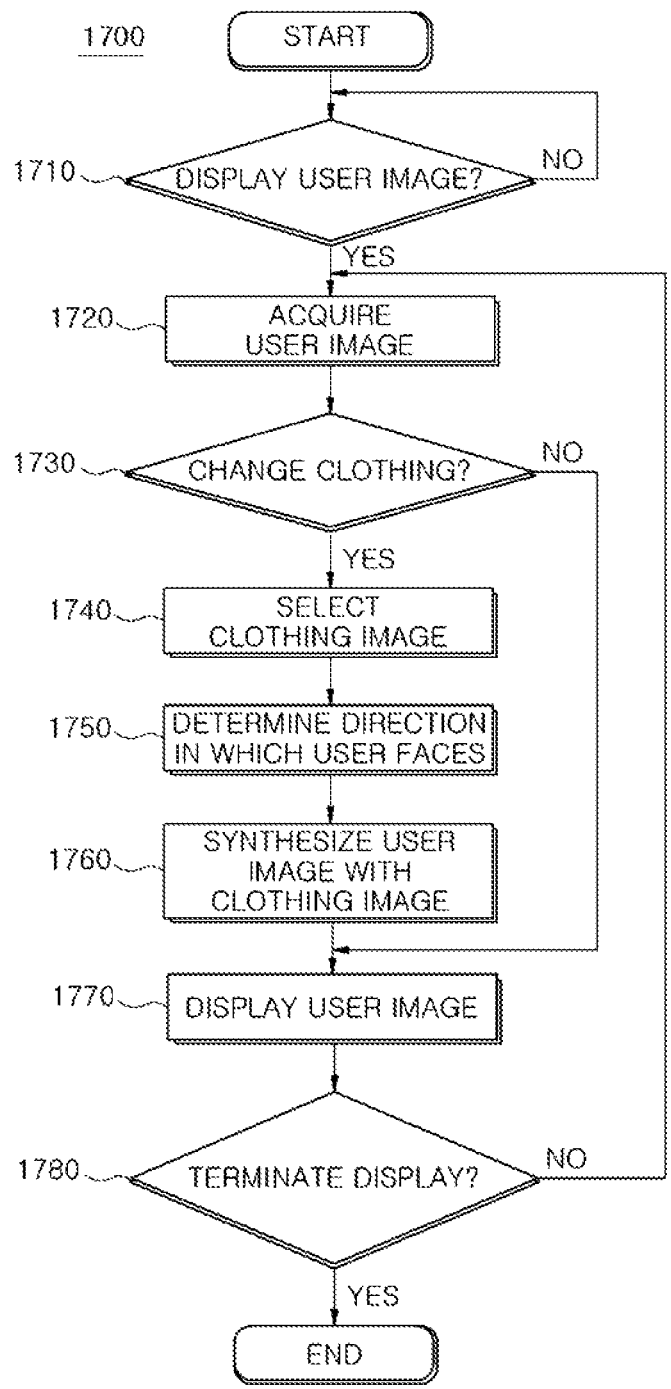
FIGS. 24, 25A-25B, and 26A-26D illustrate one example of clothing image synthesis operation configured to compose a user image and a clothing image and display a synthesis image by the image system according to an exemplary embodiment of the disclosure.

FIGS. 24, 25, and 26 illustrate one example of clothing image synthesis operation configured to compose a user image 6000 and a clothing image 7000 and display the synthesized image by the image system according to the exemplary embodiment of the disclosure.

Referring to FIGS. 24, 25, and 26, a clothing image synthesis operation (1700) is described below.

Any detailed description concerning the same operations as the above-described user image display operation, the user image storage operation, and the user image replay operation will be omitted.

The image display device 10 determines whether to display the user image (operation 1710). In order to determine whether to display the user image, the image display device 10 may determine whether the user image display command has been received from the user 5000.

When it is determined that the user image should be displayed ('Yes' of operation 1710), the image display device 10 acquires the image of the user (operation 1720). In order to acquire the user image 6000, the controller 110 of the image display device main body 100 may control the image acquirer 120, and thus, the camera module 121 may acquire the image in front of the image display device main body 100.

Then, the image display device 10 determines whether to display the user image 6000 synthesized with the clothing image 7000 (operation 1730). In order to determine whether to display the user image 6000 synthesized with the clothing image 7000, the image display device 10 may determine whether the clothing image synthesis command has been received from the user 5000.

The user 5000 may input the clothing image synthesis command in the image display device 10 using one or more of several different techniques. For example, the user 5000 may input the clothing image synthesis command to the image display device 10 through the remote device 200, or input a voice command to display the user image 6000 synthesized with the clothing image 7000, and thus the clothing image synthesis command may be input to the image display device 10.

When it is determined that the user image 6000 synthesized with the clothing image 7000 should be displayed ('Yes' of operation 1730), the clothing image 7000 to be synthesized is selected by the user in the image display device 10 (1740).

Figure 25A:
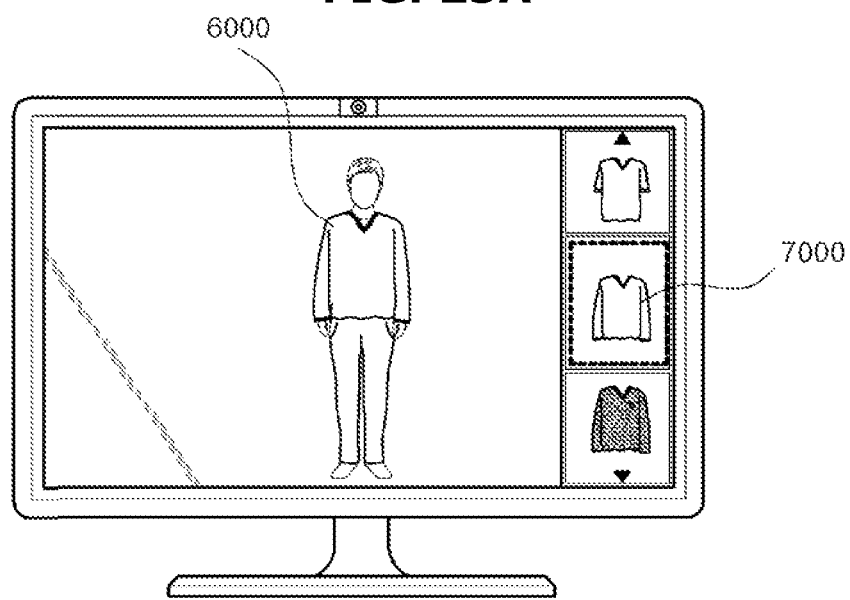

For example, when the clothing image synthesis command is input, the image display device 10 displays the clothing image previously stored in the storage 180 with the user image 6000 acquired by the image acquirer 120 as shown in FIG. 25(A).

Figure 25B:
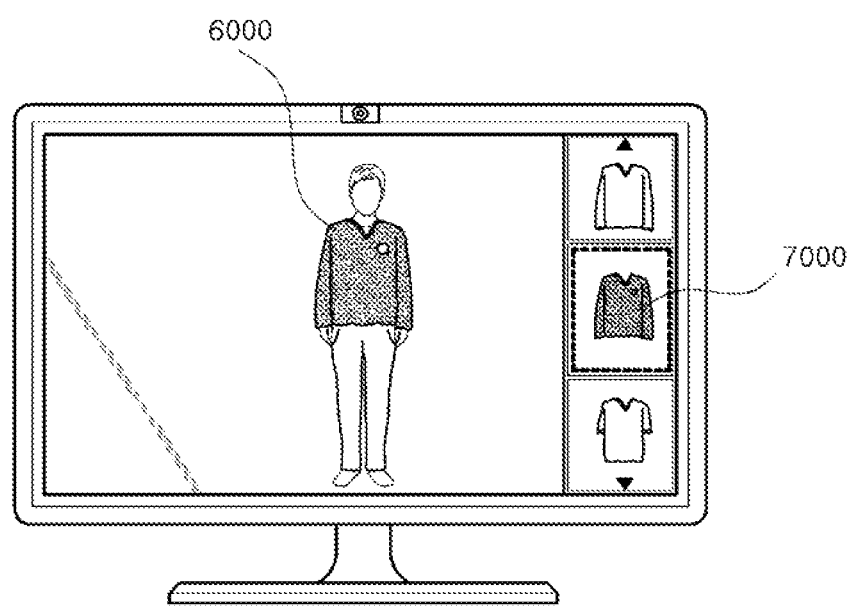

The user may select any one among clothing images using the remote device 200, or the like, and when the user 5000 selects the clothing image 7000, the image display device 10 may display the user image 6000 synthesized with the clothing image 7000, as shown in FIG. 25(B).

When the clothing image 7000 is selected, the image display device 10 determines the direction in which the user 5000 faces (operation 1750). In particular, the image display device 10 analyses the user image 6000 acquired by the image acquirer 120, and thus, determines the direction in which the body of the user 5000 faces.

Then, the image display device 10 composes the clothing image 7000 selected by the user 5000 (operation 1760). The image display device 10 may compose the clothing image 7000 corresponding to the direction in which the user 5000 faces in the user image 6000, and thus, the user image 6000 is naturally synthesized with the clothing image 7000.

Figure 26A:
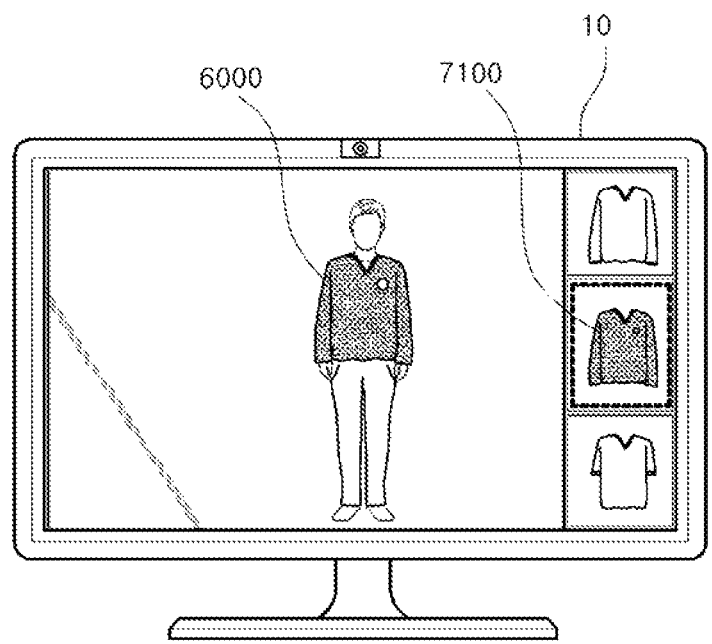
Figure 26B:
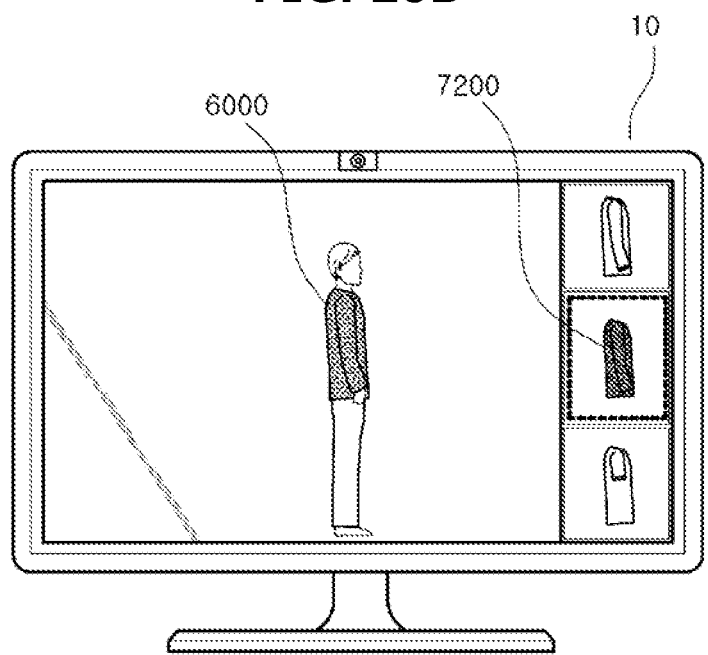

For example, when the user 5000 faces the direction (0 degrees) of the image display device 10, the image display device 10 may synthesize the user image 6000 with the front image 7100 of the clothing as shown in FIG. 26(A), and when the user 5000 faces the left direction (−90 degrees) with respect to the image display device 10, the image display device 10 may synthesize the user image 6000 with the right side image 7200 of the clothing as shown in FIG. 26(B).

Figure 26C:
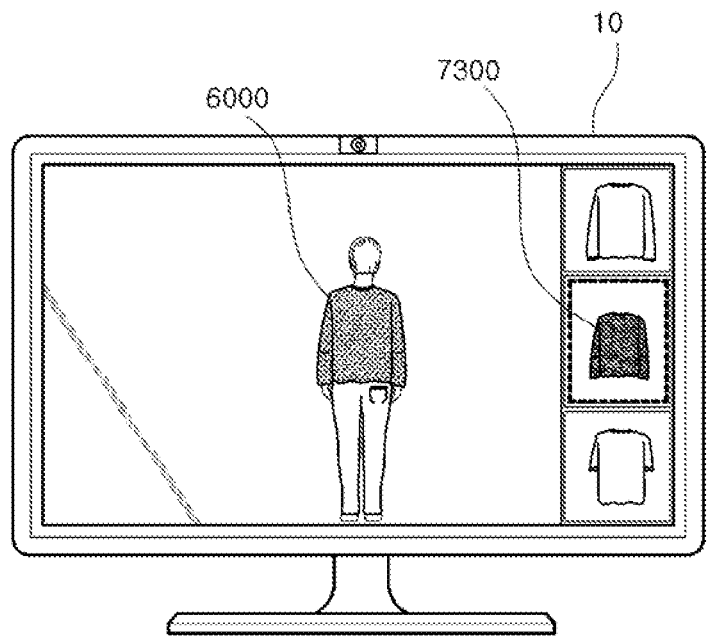
Figure 26D:
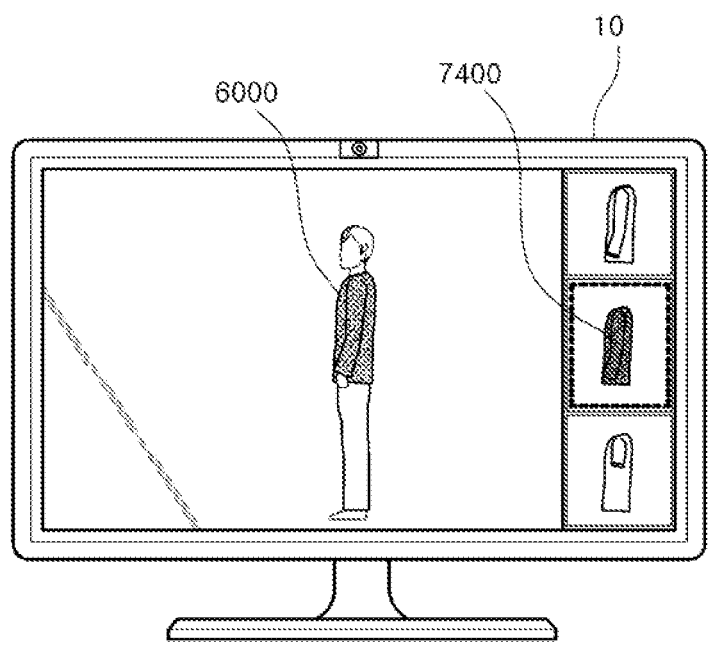

Also, when the user 5000 faces the opposite direction (−180 degrees or +180 degrees) with respect to the image display device 10, the image display device 10 may synthesize the user image 6000 with the rear image 7400 of the clothing as shown in FIG. 26(C), and when the user 5000 faces the right side direction (+90 degrees) with respect to the image display device 10, the image display device 10 may synthesize the user image 6000 with the left side image 7400 of the clothing as shown in FIG. 26(D).

Then, the image display device 10 displays the synthesized user image (operation 1770). The controller 110 of the image display device main body 100 may convert the user image 6000 into the format displayable on the image outputter 160 using the graphic processor 114. Then, the controller 110 may control the image outputter 160 to display the user image.

Then, the image display device 10 may determine whether to terminate display of the user image 6000 (operation 1780). In order to determine whether to terminate the display of the user image 6000, the image display device 10 may determine whether the user image display termination command has been received from the user 5000.

When it is determined that the user image display should not be terminated ('No' of operation 1780), the image display device 10 repeats the synthesis of the user image 6000 and the clothing image 7000 and the display of the synthesized user image.

When it is determined that the user image display should be terminated ('Yes' of operation 1680), the image display device 10 terminates the synthesis of the user image 6000 and the clothing image 7000 and the display of the synthesized user image.

As described above, the image display device 10 may synthesize the user image 6000 with the clothing image 7000 in the direction in which the user 5000 faces, and display the user image 6000 synthesized with the clothing image 7000.

Also, the clothing image 7000 may be extracted from the user image 6000 in which the user 5000 wears the clothing, and the extracted clothing image 7000 may be synthesized again with the user image 6000, and thus, the clothing image 7000 may be naturally synthesized with the user image 6000.

Also, since the clothing image 7000 is synthesized with the user image 6000 with respect to the direction in which the user 5000 faces, the clothing image 7000 may be naturally synthesized with the user image 6000 although the user 5000 moves or rotates in front of the image display device 10.

According to one exemplary embodiment, since the image acquired through the camera is displayed on the display in real time, an effect similar the experience of using a mirror may be provided to the user.

Also, according to another exemplary embodiment, the image of the clothing worn by the user can be stored, and an image of clothing to be subsequently stored is composed with the image of the user to be displayed, and thus, the image of the clothing is naturally composed to the image of the user.

Although a few exemplary embodiments have been shown and described, it would be appreciated by those skilled in the art that changes may be made in these exemplary embodiments, which are intended to be illustrative, and not to limit the scope of the claims.

What is claimed is:

1. An image display device comprising:
   an image acquirer configured to acquire a user image;
   an image outputter configured to display the user image;
   a communicator configured to perform communication with a mobile terminal;
   a storage configured to store image data including at least one of user image and clothing image; and
   a controller configured to perform a real time image display operation, the real time image display operation including displaying the user image in real time and transmitting image data processed from the user image to the mobile terminal when a real time image display command is input
   wherein when a clothing image display command is input, the controller is further configured to:

synthesize a stored clothing image with the user image;
display the synthesized image;
determine a direction in which a user faces based on the user image acquired by the image acquirer; and
overlap the clothing image corresponding to the direction of the user with the user image, and
wherein the controller performs the real time image display operation when the image acquirer acquires an image of the mobile terminal.

2. The image display device of claim 1, wherein
when the image acquirer acquires the image of the mobile terminal, the controller transmits a message inquiring whether to display the user image in real time to the mobile terminal, and
when the real time image display command is received from the mobile terminal, the controller performs the real time image display operation.

3. The image display device of claim 1, further comprising a sound receiver configured to receive a voice command,
wherein, when the voice command corresponds to the real time image display command, the controller performs the real time image display operation.

4. The image display device of claim 1,
wherein, when an image storage command is received, the controller processes the user image to generate the image data and stores the image data.

5. The image display device of claim 4, wherein when an image replay command is received, the controller restores a restored image from the stored image data, and controls the image outputter to display the restored image.

6. The image display device of claim 4, wherein when a clothing image storage command is received, the controller extracts a clothing image from the user image and stores the extracted clothing image.

7. The image display device of claim 6, wherein when the clothing image storage command is received, the controller determines a direction in which a user faces based on the image, extracts the clothing image from the user image, determines a correspondence between the extracted clothing image and the direction of the user, and stores the direction of the user and the extracted clothing image in the storage.

8. A method of controlling an image display device, comprising:
acquiring a user image;
displaying the user image;
converting the user image into user image data;
transmitting the user image data to a mobile terminal;
storing the image data when an image storage command is received; and
displaying a stored clothing image on the user image when a clothing image display command is input;
wherein transmitting the user image data to the mobile terminal includes transmitting the user image to the mobile terminal when an image of the mobile terminal is detected, and
wherein the displaying of the stored clothing image on the user image includes overlapping the clothing image with the user image.

9. The method of claim 8, wherein transmitting the user image data to the mobile terminal includes transmitting the user image to the mobile terminal when a user image display command is received from a voice.

10. The method of claim 8, further comprising displaying a restored image corresponding to the stored image data when an image replay command is received.

11. The method of claim 8, further comprising,
when a clothing image storage command is received,
extracting a clothing image from the user image; and
storing the clothing image.

12. The method of claim 11, wherein storing the clothing image includes determining a correspondence between the extracted clothing image and a direction of a user based on the user image, and storing the direction of the user and the clothing image.

* * * * *